(12) United States Patent
Kung et al.

(10) Patent No.: US 11,716,132 B2
(45) Date of Patent: Aug. 1, 2023

(54) METHOD AND APPARATUS FOR BEAM FAILURE DETECTION REGARDING MULTIPLE TRANSMISSION/RECEPTION POINTS IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 17/465,979

(22) Filed: Sep. 3, 2021

(65) Prior Publication Data

US 2022/0085862 A1 Mar. 17, 2022

Related U.S. Application Data

(60) Provisional application No. 63/077,118, filed on Sep. 11, 2020.

(51) Int. Cl.
| | | |
|---|---|---|
| *H04B 7/06* | (2006.01) | |
| *H04L 1/18* | (2006.01) | |
| *H04W 74/08* | (2009.01) | |
| *H04W 76/19* | (2018.01) | |
| *H04W 80/02* | (2009.01) | |

(Continued)

(52) U.S. Cl.
CPC ......... *H04B 7/0695* (2013.01); *H04L 1/1819* (2013.01); *H04W 74/0841* (2013.01); *H04W 76/19* (2018.02); *H04W 80/02* (2013.01)

(58) Field of Classification Search
CPC ...... H04B 7/0695; H04B 7/088; H04B 7/024; H04B 7/0408; H04B 7/061; H04L 1/1819; H04W 74/0841; H04W 76/19; H04W 80/02; H04W 76/15; H04W 24/04; H04W 74/0833; H04W 16/28
See application file for complete search history.

(56) References Cited

U.S. PATENT DOCUMENTS 11,432,328 B2 * 8/2022 Murray ............. H04W 74/0833
11,533,774 B2 * 12/2022 Cirik ..................... H04W 76/19
(Continued)

FOREIGN PATENT DOCUMENTS

WO 2018202310 A1 11/2018

OTHER PUBLICATIONS

Corresponding European Patent Application No. 21194827.8, Extended European Search Report dated Jan. 21, 2022.
(Continued)

*Primary Examiner* — Harry H Kim
(74) *Attorney, Agent, or Firm* — Cooper Legal Group LLC

(57) ABSTRACT

A method and apparatus are disclosed. In an example from the perspective of a User Equipment (UE), the UE maintains a first counter and a second counter, wherein the first counter and the second counter are associated with a Special Cell (SpCell) and are for counting beam failure instance indications. The UE initiates a first beam failure recovery (BFR) procedure based on the first counter being equal to or larger than a value, wherein the first BFR procedure includes initiating a random access procedure for SpCell BFR associated with the SpCell. The UE sets the first counter and the second counter to a defined value in response to completion of the first BFR procedure.

20 Claims, 16 Drawing Sheets

(51) Int. Cl.
  *H04W 76/15* (2018.01)
  *H04B 7/08* (2006.01)
  *H04B 7/024* (2017.01)
  *H04W 24/04* (2009.01)
  *H04B 7/0408* (2017.01)
  *H04W 16/28* (2009.01)
  *H04L 1/1812* (2023.01)

(56) References Cited

U.S. PATENT DOCUMENTS

| | | | | |
|---|---|---|---|---|
| 2019/0200396 | A1* | 6/2019 | Agiwal | H04W 72/042 |
| 2019/0245737 | A1* | 8/2019 | Zhou | H04B 7/088 |
| 2019/0306842 | A1* | 10/2019 | Cirik | H04W 72/0413 |
| 2020/0100179 | A1* | 3/2020 | Zhou | H04W 72/042 |
| 2020/0350972 | A1* | 11/2020 | Yi | H04W 76/19 |
| 2021/0194756 | A1* | 6/2021 | Babaei | H04L 41/0654 |
| 2022/0046438 | A1* | 2/2022 | Lo | H04L 5/0048 |
| 2022/0123823 | A1* | 4/2022 | Dong | H04W 74/08 |

OTHER PUBLICATIONS

Qualcomm Incorporated, "Discussion on BFE in multi-TRP operation", 3GPP TSG-RAN WG2 Meeting #107 R2-1911378, pp. 1-3, Aug. 26-30, 2019, NR_eMIMO-CORE-RELEASE 16, Agenda Item 11.16, Prague, Czech.

NTT DOCOMO, Inc., "Discussion on beam management for MTRP", 3GPP TSG RAN WG1 #102-E R1-2006721, pp. 1-5, Aug. 17-28, 2020, Agenda Item 8.1.2.3.

ASUSTek, "Discussion on beam management for TRP", 3GPP TSG RAN WG1 #106-E R1-2108030, pp. 1-3, Aug. 16-27, 2021, Agenda Item 8.1.2.3.

3rd Generation Partnership Project, Technical Specification Group Radio Access Network, NR, Medium Access Control (MAC) protocol specification, Release 16, 3GPP TS 38.321, V16.1.0, Jul. 2020, pp. 1-151.

* cited by examiner

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | Candidate RS ID or R bits ||||||

...

| AC | R | Candidate RS ID or R bits |
|---|---|---|

METHOD AND APPARATUS FOR BEAM FAILURE DETECTION REGARDING MULTIPLE TRANSMISSION/RECEPTION POINTS IN A WIRELESS COMMUNICATION SYSTEM

CROSS-REFERENCE TO RELATED APPLICATIONS

The present application claims the benefit of U.S. Provisional Patent Application Ser. No. 63/077,118 filed on Sep. 11, 2020, the entire disclosure of which is incorporated herein in its entirety by reference.

FIELD

This disclosure generally relates to wireless communication networks, and more particularly, to a method and apparatus for beam failure detection regarding multiple transmission/reception points (TRPs) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE maintains a first counter and a second counter, wherein the first counter and the second counter are associated with a Special Cell (SpCell) and are for counting beam failure instance indications. The UE initiates a first beam failure recovery (BFR) procedure based on the first counter being equal to or larger than a value, wherein the first BFR procedure comprises initiating a random access procedure for SpCell BFR associated with the SpCell. The UE sets the first counter and the second counter to a defined value in response to completion of the first BFR procedure.

In an example from the perspective of a UE, the UE maintains a first counter and a second counter, wherein the first counter and the second counter are associated with a SpCell and are for counting beam failure instance indications. The UE triggers a first BFR based on the first counter being equal to or larger than a value. The UE initiates, based on the second counter being equal to or larger than the value, a random access procedure for SpCell BFR associated with the SpCell. The UE sets the first counter and the second counter to a defined value in response to completion of the random access procedure.

BRIEF DESCRIPTION OF THE DRAWINGS

FIG. 6 is a diagram illustrating an exemplary SCell BFR and/or truncated SCell BFR MAC CE according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-193133 New WID: Further enhancements on MIMO for NR; 3GPP TS 38.321, V16.1.0, Medium Access Control (MAC) protocol specification; 3GPP TS 38.331, V16.1.0, Radio Resource Control (RRC) protocol specification; 3GPP TS 38.213, V16.2.0; R1-2006721 Discussion on beam management for MTRP, NTT DOCOMO, INC; 3GPP RAN1 #102 chairman's Notes. The standards and documents listed above are hereby expressly incorporated by reference in their entirety.

Figure 1:
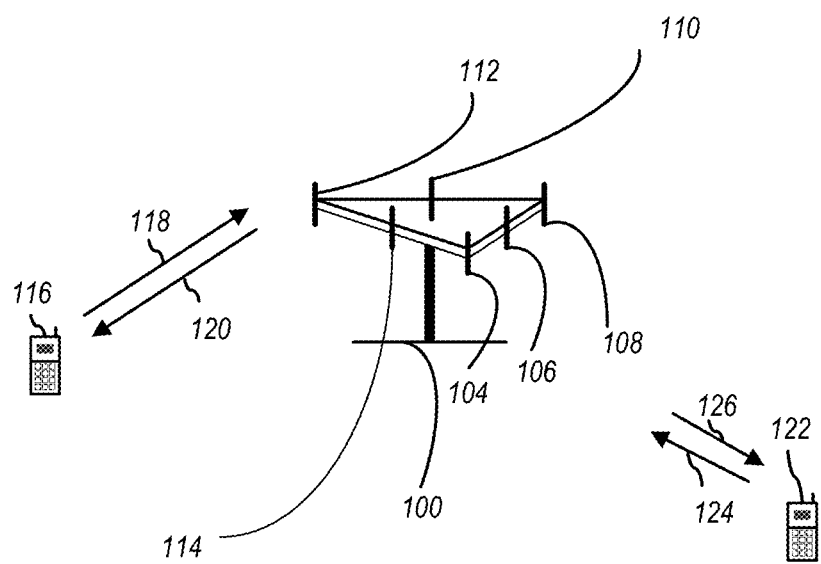
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
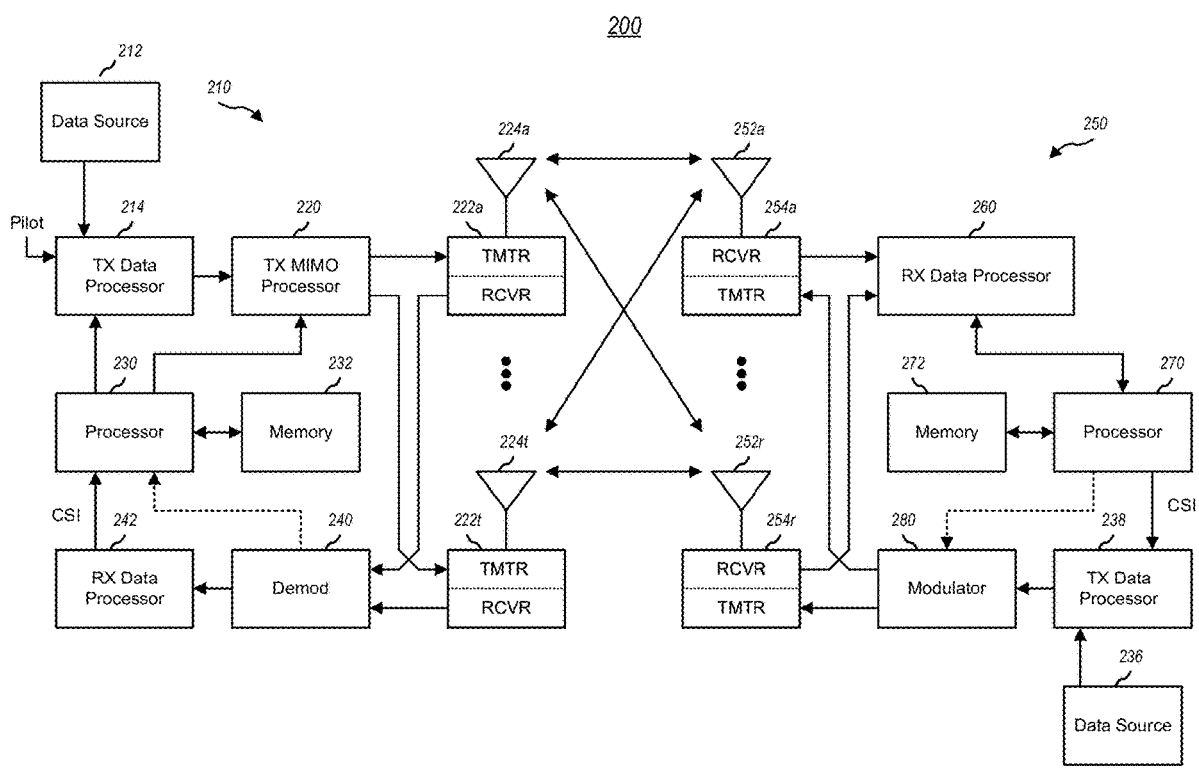
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
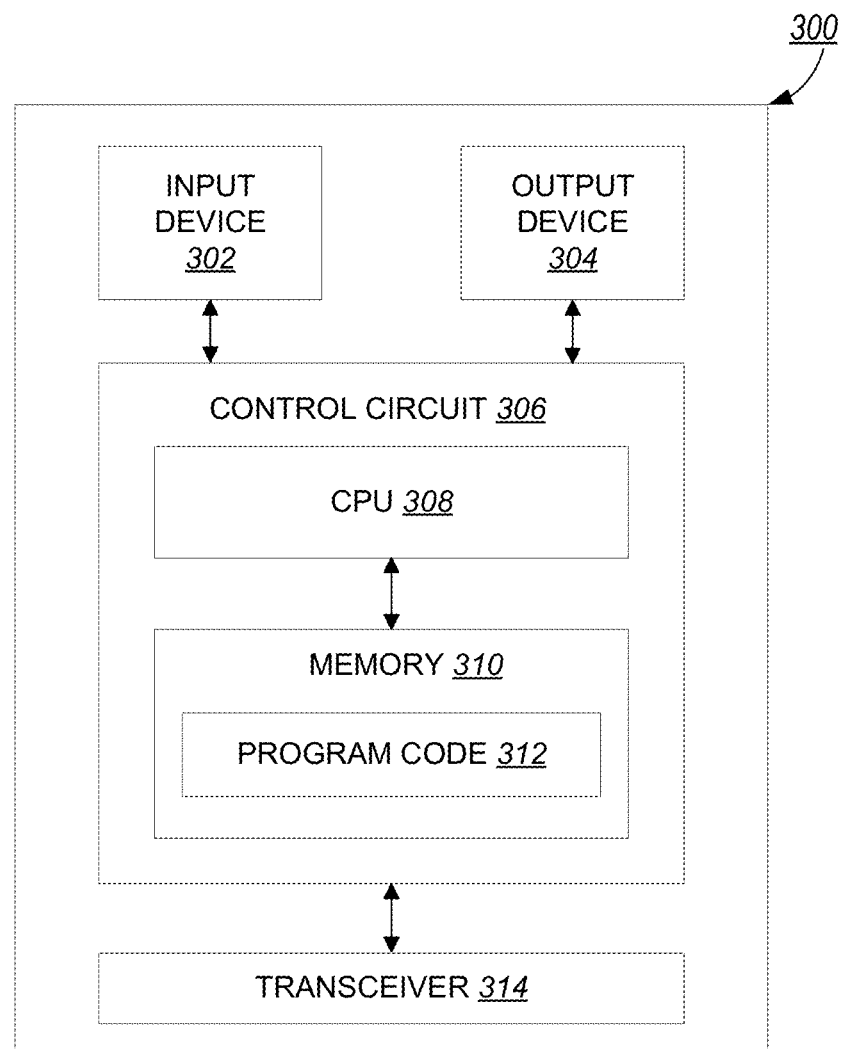
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
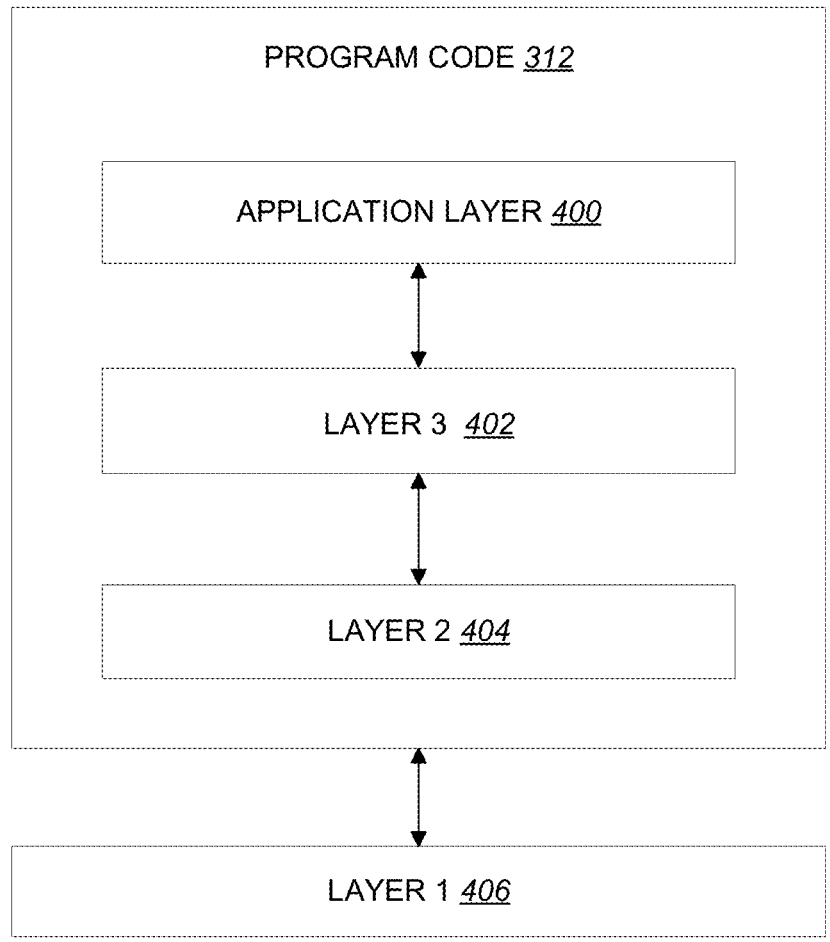
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In Work item description (WID) for further enhancements on multiple-input and multiple-output (MIMO) for NR in RP-193133 New WID, beam management considering multi-Transmission/Reception Point (TRP) and/or multi-panel operation may be considered to be an objective. One or more parts of RP-193133 New WID are quoted below:

3 Justification

The Rel-15 NR includes a number of MIMO features that facilitate utilization of a large number of antenna elements at base station for both sub-6 GHz and over-6 GHz frequency bands. The Rel-16 NR enhances Rel-15 by introducing enhanced Type II codebook with DFT-based compression, support for multi-TRP transmission especially for eMBB and PDSCH, enhancements for multi-beam operation including reduction in latency and/or overhead for various reconfigurations (QCL-related, measurements), SCell beam failure recovery (BFR), and L1-SINR. In addition, low PAPR reference signals and features enabling uplink full-power transmission are also introduced.

As NR is in the process of commercialization, various aspects that require further enhancements can be identified from real deployment scenarios. Such aspects include the following. First, while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. This also includes reducing the occurrence of beam failure events. Second, while enhancements for enabling panel-specific UL beam selection was investigated in Rel-16, there was not sufficient time to complete the work. This offers some potential for increasing UL coverage including, e.g. mitigating the UL coverage loss due to meeting the MPE (maximum permissible exposure) regulation. It is noted that MPE issue may occur on all transmit beams from the panel, therefore, a solution for MPE mitigation may only be performed per panel basis to meet the regulatory requirement for scenarios of interest.

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage. Fifth, although Rel-16 supports enhanced Type II CSI, some room for further enhancements can be perceived. This includes CSI designed for multi-TRP/panel for NC-JT use case and the utilization of partial reciprocity on channel statistics such as angle(s) and delay(s) mainly targeting FR1 FDD deployments.

4 Objective 4.1 Objective of SI or Core Part WI or Testing Part WI

Figure 5:
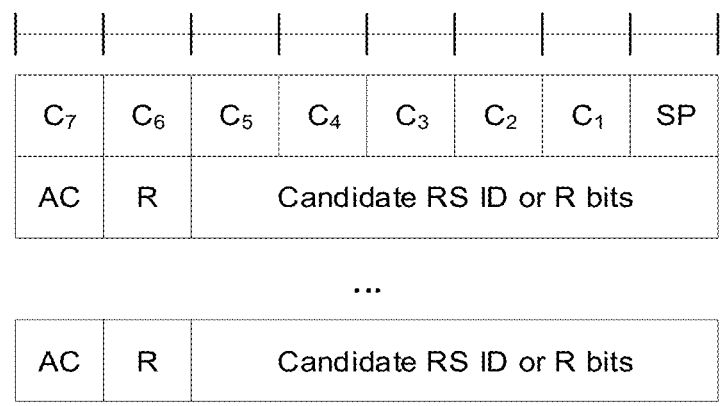
FIG. 5 is a diagram illustrating an exemplary Secondary Cell (SCell) Beam Failure Recovery (BFR) and/or truncated SCell BFR Medium Access Control (MAC) Control Element (CE) according to one exemplary embodiment.

The work item aims to specify the further enhancements identified for NR MIMO. The detailed objectives are as follows:
Extend specification support in the following areas [RAN1]
1. Enhancement on multi-beam operation, mainly targeting FR2 while also applicable to FR1:
   a. Identify and specify features to facilitate more efficient (lower latency and overhead) DL/UL beam management to support higher intra- and L1/L2-centric inter-cell mobility and/or a larger number of configured TCI states:
      i. Common beam for data and control transmission/reception for DL and UL, especially for intra-band CA
      ii. Unified TCI framework for DL and UL beam indication
      iii. Enhancement on signaling mechanisms for the above features to improve latency and efficiency with more usage of dynamic control signaling (as opposed to RRC)
   b. Identify and specify features to facilitate UL beam selection for UEs equipped with multiple panels, considering UL coverage loss mitigation due to MPE, based on UL beam indication with the unified TCI framework for UL fast panel selection
2. Enhancement on the support for multi-TRP deployment, targeting both FR1 and FR2:

a. Identify and specify features to improve reliability and robustness for channels other than PDSCH (that is, PDCCH, PUSCH, and PUCCH) using multi-TRP and/or multi-panel, with Rel.16 reliability features as the baseline
b. Identify and specify QCL/TCI-related enhancements to enable inter-cell multi-TRP operations, assuming multi-DCI based multi-PDSCH reception
c. Evaluate and, if needed, specify beam-management-related enhancements for simultaneous multi-TRP transmission with multi-panel reception
d. Enhancement to support HST-SFN deployment scenario:
   i. Identify and specify solution(s) on QCL assumption for DMRS, e.g. multiple QCL assumptions for the same DMRS port(s), targeting DL-only transmission
   ii. Evaluate and, if the benefit over Rel.16 HST enhancement baseline is demonstrated, specify QCL/QCL-like relation (including applicable type(s) and the associated requirement) between DL and UL signal by reusing the unified TCI framework A description of random access procedure, Medium Access Control (MAC) reset and Beam Failure Recovery (BFR) is introduced in 3GPP TS 38.321, V16.1.0. Notably, FIG. 6.1.3.23-1 of Section 6.1.3.23 of 3GPP TS 38.321, V16.1.0, entitled "SCell BFR and Truncated SCell BFR MAC CE with the highest ServCellIndex of this MAC entity's SCell configured with BFD is less than 8", is reproduced herein as FIG. 5. FIG. 6.1.3.23-2 of Section 6.1.3.23 of 3GPP TS 38.321, V16.1.0, entitled "SCell BFR and Truncated SCell BFR MAC CE with the highest ServCellIndex of this MAC entity's SCell configured with BFD is equal to or higher than 8", is reproduced herein as FIG. 6. One or more parts of 3GPP TS 38.321, V16.1.0 are quoted below:

3.1 Definitions

Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.

5.1 Random Access Procedure 5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.

[ . . . ]

When the Random Access procedure is initiated on a Serving Cell, the MAC entity shall:
1> flush the Msg3 buffer;
1> set the PREAMBLE_TRANSMISSION_COUNTER to 1;
1> set the PREAMBLE_POWER_RAMPING_COUNTER to 1;
1> set the PREAMBLE_BACKOFF to 0 ms;
1> if the carrier to use for the Random Access procedure is explicitly signalled:
   2> select the signalled carrier for performing Random Access procedure;
   2> set the PCMAX to $P_{CMAX,f,c}$ of the signalled carrier.
1> else if the carrier to use for the Random Access procedure is not explicitly signalled; and
1> if the Serving Cell for the Random Access procedure is configured with supplementary uplink as specified in TS 38.331 [5]; and
1> if the RSRP of the downlink pathloss reference is less than rsrp-ThresholdSSB-SUL:
   2> select the SUL carrier for performing Random Access procedure;
   2> set the PCMAX to $P_{CMAX,f,c}$ of the SUL carrier.
1> else:
   2> select the NUL carrier for performing Random Access procedure;
   2> set the PCMAX to $P_{CMAX,f,c}$ of the NUL carrier.
1> perform the BWP operation as specified in clause 5.15;
1> set PREAMBLE_POWER_RAMPING_STEP to powerRampingStep;
1> set SCALING_FACTOR_BI to 1;
1> if the Random Access procedure was initiated for beam failure recovery (as specified in clause 5.17); and
1> if beamFailureRecoveryConfig is configured for the active UL BWP of the selected carrier:
   2> start the beamFailureRecoveryTimer, if configured;
   2> apply the parameters powerRampingStep, preambleReceivedTargetPower, and preambleTransMax configured in the beamFailureRecoveryConfig;
   2> if powerRampingStepHighPriority is configured in the beamFailureRecoveryConfig:
      3> set PREAMBLE_POWER_RAMPING_STEP to the powerRampingStepHighPriority.
   2> else:
      3> set PREAMBLE_POWER_RAMPING_STEP to powerRampingStep.
   2> if scalingFactorBI is configured in the beamFailureRecoveryConfig:
      3> set SCALING_FACTOR_BI to the scalingFactorBI.
1> else if the Random Access procedure was initiated for handover; and
1> if rach-ConfigDedicated is configured for the selected carrier:
   2> if powerRampingStepHighPriority is configured in the rach-ConfigDedicated:
      3> set PREAMBLE_POWER_RAMPING_STEP to the powerRampingStepHighPriority.
   2> if scalingFactorBI is configured in the rach-ConfigDedicated:
      3> set SCALING_FACTOR_BI to the scalingFactorBI.
1> perform the Random Access Resource selection procedure (see clause 5.1.2).

5.1.2 Random Access Resource Selection
The MAC entity shall:
1> if the Random Access procedure was initiated for beam failure recovery (as specified in clause 5.17); and
1> if the beamFailureRecoveryTimer (in clause 5.17) is either running or not configured; and
1> if the contention-free Random Access Resources for beam failure recovery request associated with any of the SSBs and/or CSI-RSs have been explicitly provided by RRC; and 1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
  2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
  2> if CSI-RS is selected, and there is no ra-PreambleIndex associated with the selected CSI-RS:
    3> set the PREAMBLE_INDEX to a ra-PreambleIndex corresponding to the SSB in candidateBeamRSList which is quasi-colocated with the selected CSI-RS as specified in TS 38.214 [7].
  2> else:
    3> set the PREAMBLE_INDEX to a ra-PreambleIndex corresponding to the selected SSB or CSI-RS from the set of Random Access Preambles for beam failure recovery request.
[ . . . ]
1> else (i.e. for the contention-based Random Access preamble selection):
  2> if at least one of the SSBs with SS-RSRP above rsrp-ThresholdSSB is available:
    3> select an SSB with SS-RSRP above rsrp-ThresholdSSB.
  2> else:
    3> select any SSB.
[ . . . ]
  2> else (i.e. Msg3 is being retransmitted):
    3> select the same group of Random Access Preambles as was used for the Random Access Preamble transmission attempt corresponding to the first transmission of Msg3.
  2> select a Random Access Preamble randomly with equal probability from the Random Access Preambles associated with the selected SSB and the selected Random Access Preambles group.
  2> set the PREAMBLE_INDEX to the selected Random Access Preamble.
[ . . . ]
1> else if an SSB is selected above:
  2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1> else if a CSI-RS is selected above:
  2> if there is no contention-free Random Access Resource associated with the selected CSI-RS:
    3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
  2> else:
    3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see clause 5.1.3).
NOTE: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

5.1.3 Random Access Preamble Transmission

The MAC entity shall, for each Random Access Preamble:
1> if PREAMBLE_TRANSMISSION_COUNTER is greater than one; and
1> if the notification of suspending power ramping counter has not been received from lower layers; and
1> if SSB or CSI-RS selected is not changed from the selection in the last Random Access Preamble transmission:
  2> increment PREAMBLE_POWER_RAMPING_COUNTER by 1.
1> select the value of DELTA_PREAMBLE according to clause 7.3;
1> set PREAMBLE_RECEIVED_TARGET POWER to preambleReceivedTargetPower+DELTA_PREAMBLE+(PREAMBLE_POWER_RAMPING_COUNTER−1)×PREAMBLE_POWER_RAMPING_STEP;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX and PREAMBLE_RECEIVED_TARGET POWER.

5.1.4 Random Access Response Reception

Once the Random Access Preamble is transmitted and regardless of the possible occurrence of a measurement gap, the MAC entity shall:
1> if the contention-free Random Access Preamble for beam failure recovery request was transmitted by the MAC entity:
  2> start the ra-Response Window configured in BeamFailureRecoveryConfig at the first PDCCH occasion as specified in TS 38.213 [6] from the end of the Random Access Preamble transmission;

2> monitor for a PDCCH transmission on the search space indicated by recoverySearchSpaceId of the SpCell identified by the C-RNTI while ra-ResponseWindow is running
1> else:
2> start the ra-Response Window configured in RACH-ConfigCommon at the first PDCCH occasion as specified in TS 38.213 [6] from the end of the Random Access Preamble transmission;
2> monitor the PDCCH of the SpCell for Random Access Response(s) identified by the RA-RNTI while the ra-Response Window is running
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
2> consider the Random Access procedure successfully completed.
1> else if a downlink assignment has been received on the PDCCH for the RA-RNTI and the received TB is successfully decoded:
2> if the Random Access Response contains a MAC subPDU with Backoff Indicator:
3> set the PREAMBLE_BACKOFF to value of the BI field of the MAC subPDU using Table 7.2-1, multiplied with SCALING_FACTOR_BI.
2> else:
3> set the PREAMBLE_BACKOFF to 0 ms.
2> if the Random Access Response contains a MAC subPDU with Random Access Preamble identifier corresponding to the transmitted PREAMBLE_INDEX (see clause 5.1.3):
3> consider this Random Access Response reception successful.
2> if the Random Access Response reception is considered successful:
3> if the Random Access Response includes a MAC subPDU with RAPID only:
4> consider this Random Access procedure successfully completed;
4> indicate the reception of an acknowledgement for SI request to upper layers.
3> else:
4> apply the following actions for the Serving Cell where the Random Access Preamble was transmitted:
5> process the received Timing Advance Command (see clause 5.2);
5> indicate the preambleReceivedTargetPower and the amount of power ramping applied to the latest Random Access Preamble transmission to lower layers (i.e.

(PREAMBLE_POWER_RAMPING_COUNTER– 1)×PREAMBLE_POWER_RAMPING_STEP);

5> if the Random Access procedure for an SCell is performed on uplink carrier where puschConfig is not configured:
6> ignore the received UL grant.
5> else:
6> process the received UL grant value and indicate it to the lower layers.

4> if the Random Access Preamble was not selected by the MAC entity among the contention-based Random Access Preamble(s):
5> consider the Random Access procedure successfully completed.
4> else:
5> set the TEMPORARY C-RNTI to the value received in the Random Access Response;
5> if this is the first successfully received Random Access Response within this Random Access procedure:
6> if the transmission is not being made for the CCCH logical channel:
7> indicate to the Multiplexing and assembly entity to include a C-RNTI MAC CE in the subsequent uplink transmission.
6> obtain the MAC PDU to transmit from the Multiplexing and assembly entity and store it in the Msg3 buffer.
[ . . . ]
5.1.5 Contention Resolution
Once Msg3 is transmitted, the MAC entity shall:
1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
2> if the C-RNTI MAC CE was included in Msg3:
3> if the Random Access procedure was initiated for beam failure recovery (as specified in clause 5.17) and the PDCCH transmission is addressed to the C-RNTI; or
3> if the Random Access procedure was initiated by a PDCCH order and the PDCCH transmission is addressed to the C-RNTI; or
3> if the Random Access procedure was initiated by the MAC sublayer itself or by the RRC sublayer and the PDCCH transmission is addressed to the C-RNTI and contains a UL grant for a new transmission:
4> consider this Contention Resolution successful;
4> stop ra-ContentionResolutionTimer;
4> discard the TEMPORARY C-RNTI;
4> consider this Random Access procedure successfully completed.
[ . . . ]
5.1.6 Completion of the Random Access Procedure
Upon completion of the Random Access procedure, the MAC entity shall:
1> discard explicitly signalled contention-free Random Access Resources except contention-free Random Access Resources for beam failure recovery request, if any;
1> flush the HARQ buffer used for transmission of the MAC PDU in the Msg3 buffer.

5.12 MAC Reset

If a reset of the MAC entity is requested by upper layers, the MAC entity shall:
1> initialize Bj for each logical channel to zero;
1> stop (if running) all timers;

1> consider all timeAlignmentTimers as expired and perform the corresponding actions in clause 5.2;
1> set the NDIs for all uplink HARQ processes to the value 0;
1> sets the NDIs for all HARQ process IDs to the value 0 for monitoring PDCCH in Sidelink resource allocation mode 1;
1> stop, if any, ongoing RACH procedure;
1> discard explicitly signalled contention-free Random Access Resources for 4-step RA type and 2-step RA type, if any;
1> flush Msg3 buffer;
1> flush MSGA buffer;
1> cancel, if any, triggered Scheduling Request procedure;
1> cancel, if any, triggered Buffer Status Reporting procedure;
1> cancel, if any, triggered Power Headroom Reporting procedure;
1> cancel, if any, triggered consistent LBT failure;
1> cancel, if any, triggered Sidelink Buffer Status Reporting procedure;
1> flush the soft buffers for all DL HARQ processes;
1> for each DL HARQ process, consider the next received transmission for a TB as the very first transmission;
1> release, if any, Temporary C-RNTI;
1> reset all BFI_COUNTERs;
1> reset LBT_COUNTER.

If a Sidelink specific reset of the MAC entity is requested for a PC5-RRC connection by upper layers, the MAC entity shall:
1> flush the soft buffers for all Sidelink processes for all TB(s) associated to the PC5-RRC connection;
1> cancel, if any, triggered Scheduling Request procedure only associated to the PC5-RRC connection;
1> cancel, if any, triggered Sidelink Buffer Status Reporting procedure only associated to the PC5-RRC connection.

5.17 Beam Failure Detection and Recovery Procedure

The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing Random Access procedure for beam failure recovery for SpCell, the MAC entity shall stop the ongoing Random Access procedure and initiate a Random Access procedure using the new configuration.

RRC configures the following parameters in the BeamFailureRecoveryConfig and the RadioLinkMonitoringConfig for the Beam Failure Detection and Recovery procedure:
beamFailureInstanceMaxCount for the beam failure detection;
beamFailureDetectionTimer for the beam failure detection;
beamFailureRecoveryTimer for the beam failure recovery procedure;
rsrp-ThresholdSSB: an RSRP threshold for the beam failure recovery;
powerRampingStep: powerRampingStep for the SpCell beam failure recovery;
powerRampingStepHighPriority: powerRampingStepHighPriority for the SpCell beam failure recovery;
preambleReceivedTargetPower: preambleReceivedTargetPower for the SpCell beam failure recovery;
preambleTransMax: preambleTransMax for the SpCell beam failure recovery;
scalingFactorBI: scalingFactorBI for the SpCell beam failure recovery;
ssb-perRACH-Occasion: ssb-perRACH-Occasion for the SpCell beam failure recovery;
ra-Response Window: the time window to monitor response(s) for the SpCell beam failure recovery using contention-free Random Access Preamble;
prach-ConfigurationIndex: prach-ConfigurationIndex for the SpCell beam failure recovery;
ra-ssb-OccasionMaskIndex: ra-ssb-OccasionMaskIndex for the SpCell beam failure recovery;
ra-OccasionList: ra-OccasionList for the SpCell beam failure recovery.

The following UE variables are used for the beam failure detection procedure:
BFI_COUNTER (per Serving Cell): counter for beam failure instance indication which is initially set to 0.

The MAC entity shall for each Serving Cell configured for beam failure detection:
1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> if the Serving Cell is SCell:
4> trigger a BFR for this Serving Cell;
3> else:
4> initiate a Random Access procedure (see clause 5.1) on the SpCell.
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
2> set BFI_COUNTER to 0.
1> if the Serving Cell is SpCell and the Random Access procedure initiated for SpCell beam failure recovery is successfully completed (see clause 5.1):
2> set BFI_COUNTER to 0;
2> stop the beamFailureRecoveryTimer, if configured;
2> consider the Beam Failure Recovery procedure successfully completed.
1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
1> if the SCell is deactivated as specified in clause 5.9:
2> set BFI_COUNTER to 0;
2> consider the Beam Failure Recovery procedure successfully completed and cancel all the triggered BFRs for this Serving Cell.

The MAC entity shall:
1> if the Beam Failure Recovery procedure determines that at least one BFR has been triggered and not cancelled:

2> if UL-SCH resources are available for a new transmission and if the UL-SCH resources can accommodate the BFR MAC CE plus its subheader as a result of LCP:
   3> instruct the Multiplexing and Assembly procedure to generate the BFR MAC CE.
2> else if UL-SCH resources are available for a new transmission and if the UL-SCH resources can accommodate the Truncated BFR MAC CE plus its subheader as a result of LCP:
   3> instruct the Multiplexing and Assembly procedure to generate the Truncated BFR MAC CE.
2> else:
   3> trigger the SR for SCell beam failure recovery for each SCell for which BFR has been triggered and not cancelled.

All BFRs triggered prior to MAC PDU assembly for beam failure recovery for an SCell shall be cancelled when a MAC PDU is transmitted and this PDU includes a BFR MAC CE or Truncated BFR MAC CE which contains beam failure information of that SCell.

6.1.3.23 BFR Mac CEs

The MAC CEs for BFR consists of either:
BFR MAC CE; or
Truncated BFR MAC CE.

The BFR MAC CE and Truncated BFR MAC CE are identified by a MAC subheader with LCID/eLCID as specified in Table 6.2.1-2 and Table 6.2.1-2b.

The BFR MAC CE and Truncated BFR MAC CE have a variable size. They include a bitmap and in ascending order based on the ServCellIndex, beam failure recovery information i.e. octets containing candidate beam availability indication (AC) for SCells indicated in the bitmap. For BFR MAC CE, a single octet bitmap is used when the highest ServCellIndex of this MAC entity's SCell for which beam failure is detected is less than 8, otherwise four octets are used. A MAC PDU shall contain at most one BFR MAC CE.

For Truncated BFR MAC CE, a single octet bitmap is used for the following cases, otherwise four octets are used:
  the highest ServCellIndex of this MAC entity's SCell for which beam failure is detected is less than 8; or
  beam failure is detected for SpCell (as specified in Clause 5.17) and the SpCell is to be indicated in a Truncated BFR MAC CE and the UL-SCH resources available for transmission cannot accommodate the Truncated BFR MAC CE with the four octets bitmap plus its subheader as a result of LCP.

The fields in the BFR MAC CEs are defined as follows:
SP: This field indicates beam failure detection (as specified in clause 5.17) for the SpCell of this MAC entity. The SP field is set to 1 to indicate that beam failure is detected for SpCell only when BFR MAC CE or Truncated BFR MAC CE is to be included into a MAC PDU as part of Random Access Procedure (as specified in 5.1.3a and 5.1.4), otherwise, it is set to 0;
$C_i$ (BFR MAC CE): This field indicates beam failure detection (as specified in clause 5.17) and the presence of an octet containing the AC field for the SCell with ServCellIndex i as specified in TS 38.331 [5]. The $C_i$ field set to 1 indicates that beam failure is detected and the octet containing the AC field is present for the SCell with ServCellIndex i. The $C_i$ field set to 0 indicates that the beam failure is not detected and octet containing the AC field is not present for the SCell with ServCellIndex i. The octets containing the AC field are present in ascending order based on the ServCellIndex;
$C_i$ (Truncated BFR MAC CE): This field indicates beam failure detection (as specified in clause 5.17) for the SCell with ServCellIndex i as specified in TS 38.331 [5]. The $C_i$ field set to 1 indicates that beam failure is detected and the octet containing the AC field for the SCell with ServCellIndex i may be present. The $C_i$ field set to 0 indicates that the beam failure is not detected and the octet containing the AC field is not present for the SCell with ServCellIndex i. The octets containing the AC field, if present, are included in ascending order based on the ServCellIndex. The number of octets containing the AC field included is maximised, while not exceeding the available grant size;
NOTE: The number of the octets containing the AC field in the Truncated BFR MAC CE can be zero.
AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;
Candidate RS ID: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.
R: Reserved bit, set to 0.

FIG. 6.1.3.23-1: SCell BFR and Truncated SCell BFR MAC CE with the Highest ServCellIndex of this MAC Entity's SCell Configured with BFD is Less than 8

FIG. 6.1.3.23-2: SCell BFR and Truncated SCell BFR MAC CE with the Highest ServCellIndex of this MAC Entity's SCell Configured with BFD is Equal to or Higher than 8

A description of radio link monitoring resources and Control Resource Set (CORESET) resource configuration is introduced in 3GPP TS 38.331, V16.1.0. One or more parts of 3GPP TS 38.331, V16.1.0 are quoted below:
—ControlResourceSet
The IE ControlResourceSet is used to configure a time/frequency control resource set (CORESET) in which to search for downlink control information (see TS 38.213 [13], clause 10.1).

| ControlResourceSet information element | |
|---|---|
| ControlResourceSet ::= | SEQUENCE { |
| controlResourceSetId | ControlResourceSet Id, |
| frequencyDomainResources | BIT STRING (SIZE (45)), |
| duration | INTEGER |

| ControlResourceSet information element |
| --- |

```
(1..maxCoReSetDuration),
   cce-REG-MappingType               CHOICE {
     interleaved                       SEQUENCE {
       reg-BundleSize                    ENUMERATED {n2, n3, n6},
       interleaverSize                   ENUMERATED {n2, n3, n6},
       shiftIndex
INTEGER(0..maxNrofPhysicalResourceBlocks-1)   OPTIONAL -- Need S
     },
     nonInterleaved                    NULL
   },
   precoderGranularity               ENUMERATED {sameAsREG-bundle, allContiguousRBs},
   tci-StatesPDCCH-ToAddList         SEQUENCE(SIZE (1..maxNrofTCI-
StatesPDCCH)) OF TCI-StateId OPTIONAL,  -- Cond NotSIB1-initialBWP
   tci-StatesPDCCH-ToReleaseList     SEQUENCE(SIZE (1..maxNrofTCI-
StatesPDCCH)) OF TCI-StateId OPTIONAL,  -- Cond NotSIB1-initialBWP
   tci-PresentInDCI                  ENUMERATED {enabled}
OPTIONAL, -- Need S
   pdcch-DMRS-ScramblingID           INTEGER (0..65535)
OPTIONAL, -- Need S
   ...,
   [[
   rb-Offset-r16                     INTEGER (0..5)
OPTIONAL, -- Need S
   tci-PresentForDCI-Format1-2-r16   INTEGER (1..3)
OPTIONAL, -- Need S
   coresetPoolIndex-r16              INTEGER (0..1)
OPTIONAL, -- Need S
   controlResourceSetId-v1610        ControlResourceSetId-v1610
OPTIONAL -- Need S
   ]]
}
```

—ControlResourceSetId

The ControlResourceSetId IE concerns a short identity, used to identify a control resource set within a serving cell. The ControlResourceSetId=0 identifies the ControlResourceSet #0 configured via PBCH (MIB) and in controlResourceSetZero (ServingCellConfigCommon). The ID space is used across the BWPs of a Serving Cell. The number of CORESETs per BWP is limited to 3 (including common and UE-specific CORESETs) in Release 15.

| ControlResourceSetId information element |
| --- |

```
ControlResourceSetId ::=            INTEGER
(0..maxNrofControlResourceSets-1)
ControlResourceSetId-r16 ::=        INTEGER
(0..maxNrofControlResourceSets-1-r16)
ControlResourceSetId-v1610 ::=      INTEGER
(maxNrofControlResourceSets..maxNrofControlResourceSets-1-r16)
```

—RadioLinkMonitoringConfig

The IE RadioLinkMonitoringConfig is used to configure radio link monitoring for detection of beam- and/or cell radio link failure. See also TS 38.321 [3], clause 5.1.1.

| RadioLinkMonitoringConfig information element |
| --- |

```
RadioLinkMonitoringConfig ::=       SEQUENCE {
   failureDetectionResourcesToAddModList   SEQUENCE
(SIZE(1..maxNrofFailureDetectionResources)) OF RadioLinkMonitoringRS
OPTIONAL, -- Need N
   failureDetectionResourcesToReleaseList  SEQUENCE
(SIZE(1..maxNrofFailureDetectionResources)) OF RadioLinkMonitoringRS-Id
OPTIONAL, -- Need N
   beamFailureInstanceMaxCount       ENUMERATED {n1, n2, n3,
n4, n5, n6, n8, n10}                OPTIONAL, -- Need R
   beamFailureDetectionTimer         ENUMERATED {pbfd1, pbfd2,
pbfd3, pbfd4, pbfd5, pbfd6, pbfd8, pbfd10}  OPTIONAL, -- Need R
   ...
}
RadioLinkMonitoringRS ::=           SEQUENCE {
   radioLinkMonitoringRS-Id          RadioLinkMonitoringRS-Id,
   purpose                           ENUMERATED {beamFailure, rlf,
both},
```

| RadioLinkMonitoringConfig information element |
| --- |
| detectionResource                      CHOICE {<br>   ssb-Index                           SSB-Index,<br>   csi-RS-Index                     NZP-CSI-RS-ResourceId<br>},<br>...<br>} |

| RadioLinkMonitoringConfig field descriptions |
| --- |
| beamFailureDetection Timer |
| Timer for beam failure detection (see TS 38.321 [3], clause 5.17). See also the BeamFailureRecoveryConfig IE. Value in number of "$Q_{out,LR}$ reporting periods of Beam Failure Detection" Reference Signal (see TS 38.213 [13], clause 6). Value pbfd1 corresponds to 1 $Q_{out,LR}$ reporting period of Beam Failure Detection Reference Signal, value pbfd2 corresponds to 2 $Q_{out,LR}$ reporting periods of Beam Failure Detection Reference Signal and so on.<br>beamFailureinstanceMaxCount |
| This field determines after how many beam failure events the UE triggers beam failure recovery (see TS 38.321 [3], clause 5.17). Value n1 corresponds to 1 beam failure instance, value n2 corresponds to 2 beam failure instances and so on.<br>failureDetectionResourcesToAddModList |
| A list of reference signals for detecting beam failure and/or cell level radio link failure (RLF). The limits of the reference signals that the network can configure are specified in TS 38.213 [13], table 5-1. The network configures at most two detectionResources per BWP for the purpose beamFailure or both. If no RSs are provided for the purpose of beam failure detection, the UE performs beam monitoring based on the activated TCI-State for PDCCH as described in TS 38.213 [13], clause 6. If no RSs are provided in this list for the purpose of RLF detection, the UE performs Cell-RLM based on the activated TCI-State of PDCCH as described in TS 38.213 [13], clause 5. The network ensures that the UE has a suitable set of reference signals for performing cell-RLM. |

| RadioLinkMonitoringRS field descriptions |
| --- |
| detectionResource |
| A reference signal that the UE shall use for radio link monitoring or beam failure detection (depending on the indicated purpose). Only periodic 1-port CSI-RS for BM can be configured on SCell for beam failure detection purpose.<br>purpose |
| Determines whether the UE shall monitor the associated reference signal for the purpose of cell- and/or beam failure detection. For SCell, network only configures the value to beamFailure. |

A description of physical layer procedure regarding beam and radio link monitoring is introduced in 3GPP TS 38.213, V16.2.0. One or more parts of 3GPP TS 38.213, V16.2.0 are quoted below:

5 Radio Link Monitoring

The downlink radio link quality of the primary cell is monitored by a UE for the purpose of indicating out-of-sync/in-sync status to higher layers. The UE is not required to monitor the downlink radio link quality in DL BWPs other than the active DL BWP, as described in Clause 12, on the primary cell. If the active DL BWP is the initial DL BWP and for SS/PBCH block and CORESET multiplexing pattern 2 or 3, as described in Clause 13, the UE is expected to perform RLM using the associated SS/PBCH block when the associated SS/PBCH block index is provided by RadioLinkMonitoringRS.

If the UE is configured with a SCG, as described in [12, TS 38.331], and the parameter rlf-TimersAndConstants is provided by higher layers and is not set to release, the downlink radio link quality of the PSCell of the SCG is monitored by the UE for the purpose of indicating out-of-sync/in-sync status to higher layers. The UE is not required to monitor the downlink radio link quality in DL BWPs other than the active DL BWP on the PSCell.

A UE can be configured for each DL BWP of a SpCell [11, TS 38.321] with a set of resource indexes, through a corresponding set of RadioLinkMonitoringRS, for radio link monitoring by failureDetectionResources. The UE is provided either a CSI-RS resource configuration index, by csi-RS-Index, or a SS/PBCH block index, by ssb-Index. The UE can be configured with up to $N_{LR-RLM}$ RadioLinkMonitoringRS for link recovery procedures, as described in Clause 6, and for radio link monitoring. From the $N_{LR-RLM}$ RadioLinkMonitoringRS, up to $N_{RLM}$ RadioLinkMonitoringRS can be used for radio link monitoring depending on as described in [9, TS 38.104], and up to two RadioLinkMonitoringRS can be used for link recovery procedures.

For operation with shared spectrum channel access, when a UE is provided a SS/PBCH block index by ssb-Index, the UE is expected to perform radio link monitoring using SS/PBCH block(s) in the discovery burst transmission window as described in Clause 4.1, where the SS/PBCH block(s) have candidate SS/PBCH block index(es) corresponding to SS/PBCH block index provided by ssb-Index.

If the UE is not provided RadioLinkMonitoringRS and the UE is provided for PDCCH receptions TCI states that include one or more of a CSI-RS
- the UE uses for radio link monitoring the RS provided for the active TCI state for PDCCH reception if the active TCI state for PDCCH reception includes only one RS
- if the active TCI state for PDCCH reception includes two RS, the UE expects that one RS has QCL-TypeD [6, TS 38.214] and the UE uses the RS with QCL-TypeD for radio link monitoring; the UE does not expect both RS to have QCL-TypeD
- the UE is not required to use for radio link monitoring an aperiodic or semi-persistent RS
- For $L_{max}=4$, the UE selects the $N_{RLM}$ RS provided for active TCI states for PDCCH receptions in CORESETs associated with the search space sets in an order from the shortest monitoring periodicity. If more than one CORESETs are associated with search space sets having same monitoring periodicity, the UE determines the order of the CORESET from the highest CORESET index as described in Clause 10.1.

In non-DRX mode operation, the physical layer in the UE assesses once per indication period the radio link quality, evaluated over the previous time period defined in [10, TS 38.133] against thresholds ($Q_{out}$ and $Q_{in}$) configured by rlmInSyncOutOfSyncThreshold. The UE determines the indication period as the maximum between the shortest periodicity for radio link monitoring resources and 10 msec.

In DRX mode operation, the physical layer in the UE assesses once per indication period the radio link quality, evaluated over the previous time period defined in [10, TS 38.133], against thresholds ($Q_{out}$ and $Q_{in}$) provided by rlmInSyncOutOfSyncThreshold. The UE determines the indication period as the maximum between the shortest periodicity for radio link monitoring resources and the DRX period.

The physical layer in the UE indicates, in frames where the radio link quality is assessed, out-of-sync to higher layers when the radio link quality is worse than the threshold $Q_{out}$ for all resources in the set of resources for radio link monitoring. When the radio link quality is better than the threshold $Q_{in}$ for any resource in the set of resources for radio link monitoring, the physical layer in the UE indicates, in frames where the radio link quality is assessed, in-sync to higher layers.

6 Link Recovery Procedures

A UE can be provided, for each BWP of a serving cell, a set $\bar{q}_0$ of periodic CSI-RS resource configuration indexes by failureDetectionResources and a set $\bar{q}_1$ of periodic CSI-RS resource configuration indexes and/or SS/PBCH block indexes by candidateBeamRSList or candidateBeamRSListExt-r16 or candidateBeamRSSCellList-r16 for radio link quality measurements on the BWP of the serving cell. If the UE is not provided $\hat{q}_0$ by failureDetectionResources or beamFailureDetectionResourceList for a BWP of the serving cell, the UE determines the set $\bar{q}_0$ to include periodic CSI-RS resource configuration indexes with same values as the RS indexes in the RS sets indicated by TCI-State for respective CORESETs that the UE uses for monitoring PDCCH and, if there are two RS indexes in a TCI state, the set $\bar{q}_0$ includes RS indexes with QCL-TypeD configuration for the corresponding TCI states. The UE expects the set $\bar{q}_0$ to include up to two RS indexes. The UE expects single port RS in the set $\bar{q}_0$. The UE expects single-port or two-port CSI-RS with frequency density equal to 1 or 3 REs per RB in the set $\bar{q}_1$.

The thresholds $Q_{out,LR}$ and $Q_{in,LR}$ correspond to the default value of rlmInSyncOutOfSyncThreshold, as described in [10, TS 38.133] for $Q_{out}$, and to the value provided by rsrp-ThresholdSSB or rsrp-ThresholdBFR-r16, respectively.

The physical layer in the UE assesses the radio link quality according to the set $\bar{q}_0$ of resource configurations against the threshold $Q_{out,LR}$. For the set $\bar{q}_0$, the UE assesses the radio link quality only according to periodic CSI-RS resource configurations, or SS/PBCH blocks on the PCell or the PSCell, that are quasi co-located, as described in [6, TS 38.214], with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by powerControlOffsetSS.

In non-DRX mode operation, the physical layer in the UE provides an indication to higher layers when the radio link quality for all corresponding resource configurations in the set $\bar{q}_0$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity among the periodic CSI-RS configurations, and/or SS/PBCH blocks on the PCell or the PSCell, in the set $\bar{q}_0$ that the UE uses to assess the radio link quality and 2 msec. In DRX mode operation, the physical layer provides an indication to higher layers when the radio link quality is worse than the threshold $Q_{out,LR}$ with a periodicity determined as described in [10, TS 38.133].

For the PCell or the PSCell, upon request from higher layers, the UE provides to higher layers the periodic CSI-RS configuration indexes and/or SS/PBCH block indexes from the set $\bar{q}_1$ and the corresponding L1-RSRP measurements that are larger than or equal to the 0 in,LR threshold.

For the SCell, upon request from higher layers, the UE indicates to higher layers whether there is at least one periodic CSI-RS configuration index and/or SS/PBCH block index from the set $\bar{q}_1$ with corresponding L1-RSRP measurements that are larger than or equal to the 0 in,LR threshold, and provides the periodic CSI-RS configuration indexes and/or SS/PBCH block indexes from the set $\bar{q}_1$ and the corresponding L1-RSRP measurements that are larger than or equal to the 0 in,LR threshold, if any.

For the PCell or the PSCell, a UE can be provided a CORESET through a link to a search space set provided by recoverySearchSpaceId, as described in Clause 10.1, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

For the PCell or the PSCell, the UE can be provided, by PRACH-ResourceDedicatedBFR, a configuration for PRACH transmission as described in Clause 8.1. For PRACH transmission in slot n and according to antenna port quasi co-location parameters associated with periodic CSI-RS resource configuration or with SS/PBCH block associated with index $q_{new}$ provided by higher layers [11, TS 38.321], the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig. For PDCCH monitoring in a search space set provided by recoverySearchSpaceId and for corresponding PDSCH reception, the UE assumes the same antenna port quasi-collocation parameters as the ones associated with index $q_{new}$ until the UE receives by higher layers an activation for a TCI state or any of the parameters tci-StatesPDCCH-ToAddList and/or tci-StatesPDCCH-ToReleaseList. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state or tci-StatesPDCCH-ToAddList and/or tci-StatesPDCCH-ToReleaseList.

For the PCell or the PSCell, after 28 symbols from a last symbol of a first PDCCH reception in a search space set provided by recoverySearchSpaceId for which the UE detects a DCI format with CRC scrambled by C-RNTI or MCS-C-RNTI and until the UE receives an activation command for PUCCH-SpatialRelationInfo [11, TS 38.321] or is provided PUCCH-SpatialRelationInfo for PUCCH resource(s), the UE transmits a PUCCH on a same cell as the PRACH transmission using a same spatial filter as for the last PRACH transmission
    a power determined as described in Clause 7.2.1 with $q_u=0$, $q_d=q_{new}$, and $l=0$ For the PCell or the PSCell, after 28 symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi-collocation parameters as the ones associated with index $q_{new}$ for PDCCH monitoring in a CORESET with index 0.

A UE can be provided, by schedulingRequestID-BFR-SCell-r16, a configuration for PUCCH transmission with a link recovery request (LRR) as described in Clause 9.2.4. The UE can transmit in a first PUSCH MAC CE providing index(es) for at least corresponding SCell(s) with radio link quality worse than $Q_{out}$, LR, indication(s) of presence of $q_{new}$ for corresponding SCell(s), and index(es) $q_{new}$ for a periodic CSI-RS configuration or for a SS/PBCH block provided by higher layers, as described in [11, TS 38.321], if any, for corresponding SCell(s). After 28 symbols from a last symbol of a PDCCH reception with a DCI format scheduling a PUSCH transmission with a same HARQ process number as for the transmission of the first PUSCH and having a toggled NDI field value, the UE monitors PDCCH in all CORESETs on the SCell(s) indicated by the MAC CE using the same antenna port quasi co-location parameters as the ones associated with the corresponding index(es) $q_{new}$, if any transmits PUCCH on a PUCCH-SCell using a same spatial domain filter as the one corresponding to $q_{new}$ for periodic CSI-RS or SS/PBCH block reception, as described in Clause 9.2.2, and using a power determined as described in Clause 7.2.1 with $q_u=0$, $q_d=q_{new}$, and $l=0$, if the UE is provided PUCCH-SpatialRelationInfo for the PUCCH, a PUCCH with the LRR was either not transmitted or was transmitted on the PCell or the PSCell, and the PUCCH-SCell is included in the SCell(s) indicated by the MAC-CE where the SCS configuration for the 28 symbols is the smallest of the SCS configurations of the active DL BWP for the PDCCH reception and of the active DL BWP(s) of the at least one SCell.

In 3GPP RAN1 #102 meeting, beam failure detection and recovery enhancement regarding multiple-TRP is discussed. One or more parts of R1-2006721, associated with the 3GPP RAN1 #102 meeting, are quoted below:

Beam Failure Recovery Enhancement for MTRP
TRP-Specific BFR for MTRP
In Rel.15, RACH-based BFR is defined for PCell. In Rel-16, MAC CE based BFR is defined for SCell. For both PCell and SCell BFR, only single-TRP transmission is considered. However, for MTRP, BFD and BFR can be re-considered, which is different from single-TRP case. For example, for MTRP, if the beams on first TRP fail for a UE, the beams on second TRP may be also alive for the UE. In that case, UE can report some information via the second TRP to notify beam failure information of the first TRP. And NW can re-configure the beams for the first TRP via the available beams from the second TRP. With such method, RACH procedure can be avoided even for the PCell BFR. And for SCell, such method can enable faster beam failure recovery before both TRPs on the SCell fail. To support this TRP-specific BFR for MTRP, each step of BFR procedure should be re-considered.

• Beam Failure Detection
In order to detect the beam condition per TRP, separate beam failure detection RS can be configured for each TRP for MTRP case. In that case, the beam failure detection can be performed for each TRP, respectively.

• New Candidate Beam Detection
Similar as beam failure detection RS, separate new candidate beam can be configured for each TRP for MTRP case. After beam failure is detected for a TRP, the new candidate beam can be also detected for the TRP.

• Beam Recovery Request Transmission
When beam failure is detected for a TRP, the beam failure information as well as new candidate beam information can be transmitted via available link to the other TRP. In that case, PUCCH resource or MAC CE for BFR defined in R16 for SCell BFR may be reused or with additional TRP indication. Only when two TRPs fail at the same time, conventional BFR procedure for PCell or SCell can be applied.

• gNB Response for Beam Recovery Request
After beam recovery request is sent on the available TRP, RRC re-configuration signaling can be transmitted on the available TRP for beam measurement/reporting for the failed TRP. Or UE can switch to the new candidate beam directly for PDCCH monitoring on the failed TRP for faster beam recovery.

In 3GPP RAN1 #102 meeting, an agreement is made for enabling per-TRP based BFR, and the agreement is quoted below from 3GPP RAN1 #102 chairman's Notes:

Agreement
Evaluate enhancement to enable per-TRP based beam failure recovery starting with Rel-15/16 BFR as the baseline.
Consider following potential enhancement aspects to enable per-TRP based beam failure recovery
    Issue 1: TRP-specific BFD
    Issue 2: TRP-specific new candidate beam identification
    Issue 3: TRP-specific BFRQ
    Issue 4: gNB response enhancement
    Issue 5: UE behavior on QCL/spatial relation assumption/UL power control for DL and UL channels/RSs after receiving gNB response In NR, beam operation is introduced and/or utilized for communication between a UE and a network. In Release 15 of NR, Random Access Channel (RACH)-based Beam Failure Recovery (BFR) is defined and/or utilized for Primary Cell (PCell). Secondary Cell (SCell) BFR is introduced and/or utilized in Rel-16 with BFR Medium Access Control (MAC) Control Element (CE). In some examples, PCell BFR procedures and SCell BFR procedures are per-cell operations (e.g., a PCell BFR procedure is a per-cell operation and a SCell BFR procedure is a per-cell operation). For example, a PCell BFR procedure may be performed for a PCell (e.g., a single PCell) and/or a SCell BFR procedure may be performed for a SCell (e.g., a single SCell). For example, a BFR procedure may comprise initiating a random access procedure and/or triggering a BFR. As described in 3GPP TS 38.321, the BFR procedure may be initiated when a counter for beam failure instance indication (e.g., BFI_COUNTER) is larger than or equal to a value (e.g., beamFailureInstanceMaxCount). If the counter is associated with a Special Cell (SpCell), the random access procedure for SpCell beam failure recovery is initiated for the BFR procedure. If the counter is associated with a SCell, the BFR is triggered for the BFR procedure. If the BFR is triggered and not cancelled (e.g., the BFR is triggered based on the counter being associated with the SCell), a BFR MAC CE (or a Truncated BFR MAC CE) may be generated. For example, the BFR MAC CE (or the Truncated BFR MAC CE) may be generated when uplink shared channel (UL-SCH) resources, that can accommodate the BFR MAC CE (or the Truncated BFR MAC CE) plus its subheader, are available for a new transmission. Otherwise, if UL-SCH resources that can accommodate the BFR MAC CE (or the Truncated BFR MAC CE) plus its subheader are not available, a Scheduling Request (SR) for SCell beam failure recovery may be triggered (e.g., the SR for SCell beam failure recovery may be triggered due to the triggered BFR for the SCell). For example, for a cell associated with (and/or configured with) multiple (e.g., two) beam failure detection reference signals, a physical layer may report a beam failure instance indication of the cell to an upper layer (e.g., a MAC layer) of the UE when (e.g., only when) qualities of the multiple beam failure detection reference signals (e.g., all of the multiple beam failure detection reference signals) are less than (e.g., worse than) a threshold (e.g., a configured threshold with which the UE is configured). In an example in which the multiple beam failure detection reference signals are two beam failure detection reference signals, the physical layer may report the beam failure instance indication of the cell to the upper layer of the UE when (e.g., only when) qualities of both of the two beam failure detection reference signals are less than (e.g., worse than) the threshold. With introduction of multi-Transmission/Reception Point (TRP) regarding enhancement for multiple-input and multiple-output (MIMO) operation, an issue may occur in which a UE does not report a beam failure instance indication and/or does not perform a BFR procedure associated with a cell if a part of multiple TRPs associated with the cell experiences beam failure (e.g., only the part of the multiple TRPs that does not include all of the multiple TRPs experiences beam failure). Alternatively and/or additionally, BFR procedures may comprise different steps in different scenarios (e.g., one or more steps of a first BFR procedure in a first scenario may be different than one or more steps of a second BFR procedure in a second scenario). Actions and/or behaviors to maintain and/or handle parameters and/or variables may vary between different kinds of procedures (e.g., different kinds of BFR procedures). However, actions and/or behaviors (for BFR procedures, for example) regarding beam failure detection and/or recovery are undefined in multi-TRP operations (and thus, a network and/or a UE may not be able to efficiently perform procedures, such as BFR procedures, in multi-TRP operations). Alternatively and/or additionally, differences between actions and/or behaviors for maintaining and/or handling parameters and/or variables in different kinds of procedures (e.g., different kinds of BFR procedures) may be undefined. In accordance with the present disclosure, one or more techniques are provided for multi-TRP beam failure detection and/or recovery to enhance communication quality in a multi-TRP cell. Alternatively and/or additionally, one or more of the techniques herein provides for one or more procedures (e.g., BFR procedures) to be performed in multi-TRP scenarios, where the one or more procedures may be different than procedures for single-TRP scenarios.

A concept of the present disclosure is that a UE may maintain (and/or may be configured with) multiple counters for multiple TRPs (e.g., multiple transmission and/or reception points) associated with a cell (e.g., the multiple TRPs may be different TRPs, such as where TRPs of the multiple TRPs are different from each other). A TRP of the multiple TRPs (and/or each TRP of the multiple TRPs) may provide network coverage and/or may communicate (e.g., directly communicate) with UEs. A TRP of the multiple TRPs (and/or each TRP of the multiple TRPs) may be controlled by a base station and/or may communicate with the base station via fronthaul. Each counter of the multiple counters may be associated with one or more beam failure instance indications of a TRP (e.g., one TRP), such as a TRP (e.g., one TRP) of the multiple TRPs. Alternatively and/or additionally, each counter of the multiple counters may be associated with (e.g., indicative of) a number of beam failure instance indications of a TRP (e.g., one TRP), such as a TRP (e.g., one TRP) of the multiple TRPs. In some examples, different counters of the multiple counters may be associated with different TRPs of the multiple TRPs (and/or more than one counter of the multiple counters may not be associated with a same TRP of the multiple TRPs).

In an example, a first TRP and a second TRP may be associated with a cell. For the first TRP and the second TRP, the UE may maintain (and/or may be configured with) two counters comprising a first counter and a second counter. For example, the UE may maintain (and/or may be configured with) the first counter for the first TRP and the UE may maintain (and/or may be configured with) the second counter for the second TRP. Accordingly, the first counter may be associated with the first TRP and/or the second counter may be associated with the second TRP. The UE may increment the first counter (e.g., increment a counter value of the first counter by 1) in response to (and/or when) receiving a first beam failure instance indication associated with the first TRP from one or more lower layers (e.g., a physical layer) of the UE. The UE may not increment the second counter (e.g., may not increment a counter value of the second counter by 1) in response to (and/or when) receiving the first beam failure instance indication associated with the first TRP. The UE may increment the second counter (e.g., increment a counter value of the second counter by 1) in response to (and/or when) receiving a second beam failure instance indication associated with the second TRP from the one or more lower layers of the UE. The UE may not increment the first counter (e.g., may not increment a counter value of the first counter by 1) in response to (and/or when) receiving the second beam failure instance indication associated with the second TRP.

Alternatively and/or additionally, the UE may maintain one or more counters for one or more beam failure detection reference signals (BFD-RSs) associated with a cell (e.g., associated with a bandwidth part of the cell). The one or more BFD-RSs may comprise one, some and/or all BFD-RSs associated with the cell (e.g., one, some and/or all BFD-RSs associated with a bandwidth part of the cell). For example, the one or more counters maintained by the UE may comprise a counter (e.g., one counter) for each BFD-RS of the one or more BFD-RSs, respectively. The one or more BFD-RSs (for which the UE maintains the one or more counters, for example) may be provided (to the UE, for example) and/or configured by a network (e.g., the UE may be configured with the one or more BFD-RSs by the network). Each BFD-RS of the one or more BFD-RSs may be associated with a TRP of the cell. In some examples, different BFD-RSs of the one or more BFD-RSs may be associated with different TRPs of the cell (and/or more than one BFD-RS of the one or more BFD-RSs may not be associated with a same TRP of the cell). In some examples, the UE may increment (e.g., increment by 1) a first counter associated with a first BFD-RS of a cell (e.g., a first BFD-RS of the one or more BFD-RSs) in response to (and/or when) receiving a beam failure instance indication associated with the first BFD-RS (e.g., the first counter may correspond to a counter, of the one or more counters, associated with the first BFD-RS). The UE may not increment a second counter associated with a second BFD-RS of the cell (e.g., a second BFD-RS of the one or more BFD-RSs) in response to (and/or when) receiving the beam failure instance indication associated with the first BFD-RS (e.g., the second counter may correspond to a counter, of the one or more counters, associated with the second BFD-RS).

For example, for a cell associated with a first BFD-RS and a second BFD-RS, the UE may maintain two counters comprising a first counter and a second counter (respective to the first BFD-RS and the second BFD-RS, for example). The first counter may be associated with the first BFD-RS and/or the first TRP. The second counter may be associated with the second BFD-RS and/or the second TRP. The UE may increment (e.g., increment by 1) the first counter (associated with the first TRP) in response to (and/or when) receiving a first beam failure instance indication associated with the first TRP from one or more lower layers (e.g., a physical layer) of the UE. The UE may not increment the second counter in response to (and/or when) receiving the first beam failure instance indication associated with the first TRP. The UE may increment the second counter (associated with the second TRP) in response to (and/or when) receiving a second beam failure instance indication associated with the second TRP from the one or more lower layers of the UE. The UE may not increment the first counter in response to (and/or when) receiving the second beam failure instance indication associated with the second TRP.

Alternatively and/or additionally, the UE may maintain one or more counters for one or more groups of BFD-RSs associated with a cell (e.g., associated with a bandwidth part of the cell). The one or more groups of BFD-RSs may comprise one, some and/or all groups of BFD-RSs associated with the cell (e.g., one, some and/or all groups of BFD-RSs associated with a bandwidth part of the cell). For example, the one or more counters maintained by the UE may comprise a counter (e.g., one counter) for each group of BFD-RSs of the one or more groups of BFD-RSs, respectively. The one or more groups of BFD-RSs (for which the UE maintains the one or more counters, for example) may be provided (to the UE, for example) and/or configured by a network (e.g., the UE may be configured with the one or more groups of BFD-RSs by the network). Each group of BFD-RSs of the one or more groups of BFD-RSs may be associated with a TRP of the cell. In some examples, different groups of BFD-RSs of the one or more groups of BFD-RSs may be associated with different TRPs of the cell (and/or more than one group of BFD-RSs of the one or more groups of BFD-RSs may not be associated with a same TRP of the cell). In some examples, the UE may increment (e.g., increment by 1) a first counter associated with a first groups of BFD-RSs of a cell (e.g., a first groups of BFD-RSs of the one or more groups of BFD-RSs) in response to (and/or when) receiving a beam failure instance indication associated with the first group of BFD-RSs (e.g., the first counter may correspond to a counter, of the one or more counters, associated with the first group of BFD-RSs). The UE may not increment a second counter associated with a second group of BFD-RSs of the cell (e.g., a second group of BFD-RSs of the one or more groups of BFD-RSs) in response to (and/or when) receiving the beam failure instance indication associated with the first group of BFD-RSs (e.g., the second counter may correspond to a counter, of the one or more counters, associated with the second group of BFD-RSs).

For example, for a cell associated with a first group of BFD-RSs and a second group of BFD-RSs, the UE may maintain two counters comprising a first counter and a second counter (respective to the first group of BFD-RSs and the second group of BFD-RSs, for example). The first counter may be associated with the first group of BFD-RSs and/or the first TRP. The second counter may be associated with the second group of BFD-RSs and/or the second TRP. The UE may increment (e.g., increment by 1) the first counter (associated with the first TRP) in response to (and/or when) receiving a first beam failure instance indication associated with the first TRP from one or more lower layers (e.g., a physical layer) of the UE. The UE may not increment the second counter in response to (and/or when) receiving the first beam failure instance indication associated with the first TRP. The UE may increment the second counter (associated with the second TRP) in response to (and/or when) receiving a second beam failure instance indication associated with the second TRP from the one or more lower layers of the UE. The UE may not increment the first counter in response to (and/or when) receiving the second beam failure instance indication associated with the second TRP.

Alternatively and/or additionally, the UE may maintain one or more counters for one or more activated Transmission Configuration Indicator (TCI) states for Physical Downlink Control Channel (PDCCH) associated with a cell (e.g., associated with a bandwidth part of a cell). The one or more activated TCI states for PDCCH may comprise one, some and/or all activated TCI states for PDCCH associated with the cell (e.g., one, some and/or all activated TCI states for PDCCH associated with a bandwidth part of the cell). For example, the one or more counters maintained by the UE may comprise a counter (e.g., one counter) for each activated TCI state of the one or more activated TCI states for PDCCH, respectively. The one or more activated TCI states for PDCCH (for which the UE maintains the one or more counters, for example) may be provided (to the UE, for example) and/or configured by a network (e.g., the UE may be configured with the one or more activated TCI states for PDCCH by the network). Each activated TCI state of the one or more activated TCI states for PDCCH may be associated with a TRP of the cell. In some examples, different activated TCI states of the one or more activated TCI states for PDCCH may be associated with different TRPs of the cell (and/or more than one activated TCI state of the one or more activated TCI states for PDCCH may not be associated with a same TRP of the cell). In some examples, the UE may increment (e.g., increment by 1) a first counter associated with a first activated TCI state for PDCCH of a cell (e.g., a first activated TCI state of the one or more activated TCI states for PDCCH) in response to (and/or when) receiving a beam failure instance indication associated with the first activated TCI state for PDCCH (e.g., the first counter may correspond to a counter, of the one or more counters, associated with the first activated TCI state for PDCCH). The UE may not increment a second counter associated with a second activated TCI state for PDCCH of the cell (e.g., a second activated TCI state of the one or more activated TCI states for PDCCH) in response to (and/or when) receiving the beam failure instance indication associated with the first activated TCI state for PDCCH (e.g., the second counter may correspond to a counter, of the one or more counters, associated with the second activated TCI state for PDCCH).

For example, for a cell associated with one or more first activated TCI states for PDCCH and one or more second activated TCI states for PDCCH, the UE may maintain two counters comprising a first counter for the one or more first activated TCI states for PDCCH and a second counter for the one or more second activated TCI states for PDCCH, respectively. The first counter may be associated with the one or more first activated TCI states for PDCCH and/or the first TRP. The second counter may be associated with the one or more second activated TCI states for PDCCH and/or the second TRP. The UE may increment (e.g., increment by 1) the first counter (associated with the first TRP) in response to (and/or when) receiving a first beam failure instance indication associated with the first TRP from one or more lower layers (e.g., a physical layer) of the UE. The UE may not increment the second counter in response to (and/or when) receiving the first beam failure instance indication associated with the first TRP. The UE may increment the second counter (associated with the second TRP) in response to (and/or when) receiving a second beam failure instance indication associated with the second TRP from the one or more lower layers of the UE. The UE may not increment the first counter in response to (and/or when) receiving the second beam failure instance indication associated with the second TRP.

Alternatively and/or additionally, the UE may maintain one or more counters for one or more groups of activated TCI states for PDCCH associated with a cell (e.g., associated with a bandwidth part of a cell). The one or more groups of activated TCI states for PDCCH may comprise one, some and/or all groups of activated TCI states for PDCCH associated with the cell (e.g., one, some and/or all groups of activated TCI states for PDCCH associated with a bandwidth part of the cell). For example, the one or more counters maintained by the UE may comprise a counter (e.g., one counter) for each group of activated TCI states of the one or more groups of activated TCI states for PDCCH, respectively. The one or more groups of activated TCI states for PDCCH (for which the UE maintains the one or more counters, for example) may be provided (to the UE, for example) and/or configured by a network (e.g., the UE may be configured with the one or more groups of activated TCI states for PDCCH by the network). Each group of activated TCI states of the one or more groups of activated TCI states for PDCCH may be associated with a TRP of the cell. In some examples, different groups of activated TCI states of the one or more groups of activated TCI states for PDCCH may be associated with different TRPs of the cell (and/or more than one group of activated TCI states of the one or more groups of activated TCI states for PDCCH may not be associated with a same TRP of the cell). In some examples, the UE may increment (e.g., increment by 1) a first counter associated with a first group of activated TCI states for PDCCH of a cell (e.g., a first group of activated TCI states of the one or more activated TCI states for PDCCH) in response to (and/or when) receiving a beam failure instance indication associated with the first group of activated TCI states for PDCCH (e.g., the first counter may correspond to a counter, of the one or more counters, associated with the first group of activated TCI states for PDCCH). The UE may not increment a second counter associated with a second group of activated TCI states for PDCCH of the cell (e.g., a second group of activated TCI states of the one or more activated TCI states for PDCCH) in response to (and/or when) receiving the beam failure instance indication associated with the first group of activated TCI states for PDCCH (e.g., the second counter may correspond to a counter, of the one or more counters, associated with the second group of activated TCI states for PDCCH).

For example, for a cell associated with a first group of activated TCI states for PDCCH and a second group of activated TCI states for PDCCH, the UE may maintain two counters comprising a first counter for the first group of activated TCI states for PDCCH and a second counter for the second group of activated TCI states for PDCCH, respectively. The first counter may be associated with the first group of activated TCI states for PDCCH and/or the first TRP. The second counter may be associated with the second group of activated TCI states for PDCCH and/or the second TRP. The UE may increment (e.g., increment by 1) the first counter (associated with the first TRP) in response to (and/or when) receiving a first beam failure instance indication associated with the first TRP from one or more lower layers (e.g., a physical layer) of the UE. The UE may not increment the second counter in response to (and/or when) receiving the first beam failure instance indication associated with the first TRP. The UE may increment the second counter (associated with the second TRP) in response to (and/or when) receiving a second beam failure instance indication associated with the second TRP from the one or more lower layers of the UE. The UE may not increment the first counter in response to (and/or when) receiving the second beam failure instance indication associated with the second TRP.

Alternatively and/or additionally, the UE may maintain one or more counters for one or more Control Resource Set (CORESET) pools (e.g., one or more CORESET pool indexes) associated with a cell. The one or more CORESET pools may comprise one, some and/or all CORESET pools associated with the cell. For example, the one or more counters maintained by the UE may comprise a counter (e.g., one counter) for each CORESET pool (e.g., CORESET pool index) of the one or more CORESET pools, respectively. Each CORESET pool of the one or more CORESET pools may be associated with a TRP of the cell. In some examples, different CORESET pools of the one or more CORESET pools may be associated with different TRPs of the cell (and/or more than one CORESET pool of the one or more CORESET pools may not be associated with a same TRP of the cell). In an example, the UE may maintain a first counter for a first CORESET pool of a cell (e.g., a first CORESET pool of the one or more CORESET pools) and a second counter for a second CORESET pool of the cell (e.g., a second CORESET pool of the one or more CORESET pools). In some examples, the UE may increment (e.g., increment by 1) the first counter in response to (and/or when) receiving a first beam failure instance indication associated with the first CORESET pool. The first beam failure instance (indicated by the first beam failure instance indication, for example) may be associated with a PDCCH reception associated with a first CORESET in the first CORESET pool (e.g., the first CORESET may not be in the second CORESET pool). The UE may not increment the second counter in response to (and/or when) receiving the first beam failure instance indication associated with the first CORESET pool. The UE may increment (e.g., increment by 1) the second counter in response to (and/or when) receiving a second beam failure instance indication associated with the second CORESET pool. The second beam failure instance (indicated by the second beam failure instance indication, for example) may be associated with a PDCCH reception associated with a second CORESET in the second CORESET pool (e.g., the second CORESET may not be in the first CORESET pool). The UE may not increment the first counter in response to (and/or when) receiving the second beam failure instance indication associated with the second CORESET pool.

In some examples, the UE may be configured with multi-TRP operation of the cell. If the UE is configured with multi-TRP operation for the cell, the UE may be configured with and/or may maintain counters (e.g., different counters) comprising a counter for each BFD-RS of the cell, each group of BFD-RSs of the cell, each activated TCI state for PDCCH of the cell, each group of activated TCI states for PDCCH of the cell and/or each CORESET pool of the cell. For example, a first counter of the counters may be associated with (e.g., may be for) a first BFD-RS of the cell, a first group of BFD-RSs of the cell, a first activated TCI state for PDCCH of the cell, a first group of activated TCI states for PDCCH of the cell and/or a first CORESET pool of the cell. A second counter of the counters may be associated with (e.g., may be for) a second BFD-RS of the cell, a second group of BFD-RSs of the cell, a second activated TCI state for PDCCH of the cell, a second group of activated TCI states for PDCCH of the cell and/or a second CORESET pool of the cell. In some examples, different counters of the counters may be associated with different BFD-RSs of the cell, different groups of BFD-RSs of the cell, different activated TCI states for PDCCH of the cell, different groups of activated TCI states for PDCCH of the cell and/or different CORESET pools of the cell (and/or more than one counter of the counters may not be associated with a same BFD-RS of the cell, a same group of BFD-RSs of the cell, a same activated TCI state for PDCCH of the cell, a same group of activated TCI states for PDCCH of the cell and/or a same CORESET pool of the cell). If the UE is configured with single-TRP operation for the cell, the UE may be configured with and/or may maintain a counter (e.g., a shared and/or common counter) for BFD-RSs of the cell (e.g., all BFD-RSs of the cell), groups of BFD-RSs of the cell (e.g., all groups of BFD-RSs of the cell), activated TCI states for PDCCH of the cell (e.g., all activated TCI states for PDCCH of the cell), groups of activated TCI states for PDCCH of the cell (e.g., all groups of activated TCI states for PDCCH of the cell) and/or CORESET pools of the cell (e.g., all CORESET pools of the cell).

In some examples, the UE may initiate a random access procedure on the cell and/or may trigger a BFR associated with the cell in response to (and/or when) a value of a counter (associated with the cell, for example) is equal to or larger than a threshold (e.g., a network-configured threshold). In response to the triggered BFR, the UE may trigger a Scheduling Request (SR) (for SpCell BFR or SCell BFR, for example).

Alternatively and/or additionally, a UE may maintain (and/or may be configured with) multiple thresholds for multiple TRPs of a cell (where TRPs of the multiple TRPs may be different from each other). In some examples, each threshold of the multiple thresholds may be associated with a number of beam failure instance indications of a TRP (e.g., one TRP), such as a TRP (e.g., one TRP) of the multiple TRPs. The UE may trigger a BFR and/or initiate a random access procedure on the cell in response to the number of beam failure instance indications of the TRP of the cell becoming larger than or equal to the threshold (in a period of time, for example). Alternatively and/or additionally, the UE may trigger the BFR and/or initiate the random access procedure on the cell when the number of beam failure instance indications of the TRP of the cell is larger than or equal to the threshold (in the period of time, for example). In an example, the number of beam failure instance indications may correspond to a count of beam failure instance indications associated with the TRP of the cell. Alternatively and/or additionally, the number of beam failure instance indications may correspond to a count of beam failure instance indications, associated with the TRP of the cell, in the period of time. In some examples, the period of time may be a configured period of time, such as a period of time with which the UE is configured.

Alternatively and/or additionally, the UE may maintain one or more thresholds for one or more BFD-RSs associated with a cell (e.g., associated with a bandwidth part of the cell). The one or more BFD-RSs may comprise one, some and/or all BFD-RSs associated with the cell (e.g., one, some and/or all BFD-RSs associated with a bandwidth part of the cell). In some examples, a threshold of the one or more thresholds may be a threshold number of beam failure instance indications. For example, the one or more thresholds maintained by the UE may comprise a threshold (e.g., one threshold) for each BFD-RS of the one or more BFD-RSs, respectively. The one or more BFD-RSs (for which the UE maintains the one or more thresholds, for example) may be provided (to the UE, for example) and/or configured by a network (e.g., the UE may be configured with the one or more BFD-RSs by the network). Each BFD-RS of the one or more BFD-RSs may be associated with a TRP of the cell. In some examples, different BFD-RSs of the one or more BFD-RSs may be associated with different TRPs of the cell (and/or more than one BFD-RS of the one or more BFD-RSs may not be associated with a same TRP of the cell).

In an example, the UE may be configured with a first BFD-RS for a cell and a second BFD-RS for the cell. The UE maintains a first threshold for the first BFD-RS and a second threshold for the second BFD-RS. The UE may trigger a BFR and/or initiate a random access procedure on the cell in response to a number of beam failure instance indications associated with the first BFD-RS of the cell becoming larger than or equal to the first threshold (in a period of time, such as a configured period of time, for example). Alternatively and/or additionally, the UE may trigger the BFR and/or initiate the random access procedure on the cell when the number of beam failure instance indications associated with the first BFD-RS of the cell is larger than or equal to the first threshold (in the period of time, for example). In some examples, when the UE triggers the BFR and/or initiates the random access procedure on the cell, a second number of beam failure instance indications associated with the second BFR-RS may be smaller than the second threshold.

Alternatively and/or additionally, the UE may maintain one or more thresholds for one or more groups of BFD-RSs associated with a cell (e.g., associated with a bandwidth part of the cell). The one or more groups of BFD-RSs may comprise one, some and/or all groups of BFD-RSs associated with the cell (e.g., one, some and/or all groups of BFD-RSs associated with a bandwidth part of the cell). In some examples, a threshold of the one or more thresholds may be a threshold number of beam failure instance indications. For example, the one or more thresholds maintained by the UE may comprise a threshold (e.g., one threshold) for each group of BFD-RSs of the one or more groups of BFD-RSs, respectively. The one or more groups of BFD-RSs (for which the UE maintains the one or more thresholds, for example) may be provided (to the UE, for example) and/or configured by a network (e.g., the UE may be configured with the one or more groups of BFD-RSs by the network). Each group of BFD-RSs of the one or more groups of BFD-RSs may be associated with a TRP of the cell. In some examples, different groups of BFD-RSs of the one or more groups of BFD-RSs may be associated with different TRPs of the cell (and/or more than one group of BFD-RSs of the one or more groups of BFD-RSs may not be associated with a same TRP of the cell).

In an example, the UE may be configured with a first group of BFD-RSs and a second group of BFD-RSs for a cell. The UE maintains a first threshold for the first group of BFD-RSs and a second threshold for the second group of BFD-RSs. The UE may trigger a BFR and/or initiate a random access procedure on the cell in response to a number of beam failure instance indications associated with the first group of BFD-RSs of the cell becoming larger than or equal to the first threshold (in a period of time, such as a configured period of time, for example). Alternatively and/or additionally, the UE may trigger the BFR and/or initiate the random access procedure on the cell when the number of beam failure instance indications associated with the first group of BFD-RSs of the cell is larger than or equal to the first threshold. In some examples, when the UE triggers the BFR and/or initiates the random access procedure on the cell, a second number of beam failure instance indications associated with the second group of BFD-RSs may be smaller than the second threshold.

Alternatively and/or additionally, the UE may maintain one or more thresholds for one or more activated TCI states for PDCCH associated with a cell (e.g., associated with a bandwidth part of a cell). The one or more activated TCI states for PDCCH may comprise one, some and/or all activated TCI states for PDCCH associated with the cell (e.g., one, some and/or all activated TCI states for PDCCH associated with a bandwidth part of the cell). In some examples, a threshold of the one or more thresholds may be a threshold number of beam failure instance indications. For example, the one or more thresholds maintained by the UE may comprise a threshold (e.g., one threshold) for each activated TCI state of the one or more activated TCI states for PDCCH, respectively. The one or more activated TCI states for PDCCH (for which the UE maintains the one or more thresholds, for example) may be provided (to the UE, for example) and/or configured by a network (e.g., the UE may be configured with the one or more activated TCI states for PDCCH by the network). Each activated TCI state of the one or more activated TCI states for PDCCH may be associated with a TRP of the cell. In some examples, different activated TCI states of the one or more activated TCI states for PDCCH may be associated with different TRPs of the cell (and/or more than one activated TCI state of the one or more activated TCI states for PDCCH may not be associated with a same TRP of the cell).

In an example, the UE may be configured with one or more first activated TCI states for PDCCH for a cell and one or more second activated TCI states for PDCCH for the cell. The UE maintains a first threshold for the one or more first activated TCI states for PDCCH and a second threshold for the one or more second activated TCI states for PDCCH. The UE may trigger a BFR and/or initiate a random access procedure on the cell in response to a number of beam failure instance indications associated with the one or more first activated TCI states for PDCCH of the cell becoming larger than or equal to the first threshold (in a period of time, such as a configured period of time, for example). Alternatively and/or additionally, the UE may trigger the BFR and/or initiate the random access procedure on the cell when the number of beam failure instance indications associated with the one or more first activated TCI states for PDCCH of the cell is larger than or equal to the first threshold (in the period of time, for example). In some examples, when the UE triggers the BFR and/or initiates the random access procedure on the cell, a second number of beam failure instance indications associated with the one or more second activated TCI states for PDCCH may be smaller than the second threshold.

Alternatively and/or additionally, the UE may maintain one or more thresholds for one or more groups of activated TCI states for PDCCH associated with a cell (e.g., associated with a bandwidth part of a cell). The one or more groups of activated TCI states for PDCCH may comprise one, some and/or all groups of activated TCI states for PDCCH associated with the cell (e.g., one, some and/or all groups of activated TCI states for PDCCH associated with a bandwidth part of the cell). In some examples, a threshold of the one or more thresholds may be a threshold number of beam failure instance indications. For example, the one or more thresholds maintained by the UE may comprise a threshold (e.g., one threshold) for each group of activated TCI states of the one or more groups of activated TCI states for PDCCH, respectively. The one or more groups of activated TCI states for PDCCH (for which the UE maintains the one or more thresholds, for example) may be provided (to the UE, for example) and/or configured by a network (e.g., the UE may be configured with the one or more groups of activated TCI states for PDCCH by the network). Each group of activated TCI states of the one or more groups of activated TCI states for PDCCH may be associated with a TRP of the cell. In some examples, different groups of activated TCI states of the one or more groups of activated TCI states for PDCCH may be associated with different TRPs of the cell (and/or more than one group of activated TCI states of the one or more groups of activated TCI states for PDCCH may not be associated with a same TRP of the cell).

In an example, the UE may be configured with a first group of activated TCI states for PDCCH for a cell and a second group of activated TCI states for PDCCH for the cell. The UE maintains a first threshold for the first group of activated TCI states for PDCCH and a second threshold for the second group of activated TCI states for PDCCH. The UE may trigger a BFR and/or initiate a random access procedure on the cell in response to a number of beam failure instance indications associated with the first group of activated TCI states for PDCCH of the cell becoming larger than or equal to the first threshold (in a period of time, such as a configured period of time, for example). Alternatively and/or additionally, the UE may trigger the BFR and/or initiate the random access procedure on the cell when the number of beam failure instance indications associated with the first group of activated TCI states for PDCCH of the cell is larger than or equal to the first threshold (in the period of time, for example). In some examples, when the UE triggers the BFR and/or initiates the random access procedure on the cell, a second number of beam failure instance indications associated with the second group of activated TCI states for PDCCH may be smaller than the second threshold.

Alternatively and/or additionally, the UE may maintain one or more thresholds for one or more CORESET pools associated with a cell (e.g., associated with a bandwidth part of the cell). The one or more CORESET pools may comprise one, some and/or all CORESET pools associated with the cell. In some examples, a threshold of the one or more thresholds may be a threshold number of beam failure instance indications. For example, the one or more thresholds maintained by the UE may comprise a threshold (e.g., one threshold) for each CORESET pool of the one or more CORESET pools, respectively. The one or more CORESET pools (for which the UE maintains the one or more thresholds, for example) may be provided (to the UE, for example) and/or configured by a network (e.g., the UE may be configured with the one or more CORESET pools by the network). Each CORESET pool of the one or more CORESET pools may be associated with a TRP of the cell. In some examples, different CORESET pools of the one or more CORESET pools may be associated with different TRPs of the cell (and/or more than one CORESET pool of the one or more CORESET pools may not be associated with a same TRP of the cell).

In an example, the UE may be configured with a first CORESET pool and a second CORESET pool for the cell. The UE maintains a first threshold for the first CORESET pool and a second threshold for the second CORESET pool. The UE may trigger a BFR and/or initiate a random access procedure on the cell in response to a number of beam failure instance indications associated with the first CORESET pool of the cell becoming larger than or equal to the first threshold (in a period of time, such as a configured period of time, for example). Alternatively and/or additionally, the UE may trigger the BFR and/or initiate the random access procedure on the cell when the number of beam failure instance indications associated with the first CORESET pool of the cell is larger than or equal to the first threshold (in the period of time, for example). In some examples, when the UE triggers the BFR and/or initiates the random access procedure on the cell, a second number of beam failure instance indications associated with the second CORESET pool may be smaller than the second threshold.

The UE may maintain multiple thresholds, wherein each threshold of the thresholds is associated with (e.g., is for) a TRP of a cell, a BFD-RS, a group of BFD-RSs, an activated TCI state for PDCCH, a group of activated TCI states for PDCCH and/or a CORESET pool. In an example, a first threshold of the multiple thresholds may be associated with (e.g., may be for) a first TRP of the cell, a first BFD-RS, a first group of BFD-RSs, a first activated TCI state for PDCCH, a first group of activated TCI states for PDCCH and/or a first CORESET pool. A second threshold of the multiple thresholds may be associated with (e.g., may be for) a second TRP of the cell, a second BFD-RS, a second group of BFD-RSs, a second activated TCI state for PDCCH, a second group of activated TCI states for PDCCH and/or a second CORESET pool.

In some examples, thresholds of the multiple thresholds may have (and/or may be configured with) different values. For example, the first threshold of the multiple thresholds may have (and/or may be configured with) a first threshold value (e.g., a first threshold number of beam failure instance indications) and the second threshold of the multiple thresholds may have (and/or may be configured with) a second threshold value (e.g., a second threshold number of beam failure instance indications) that is different than the first threshold value. Alternatively and/or additionally, all thresholds of the multiple thresholds may be different (e.g., unique to each other), such as where no two thresholds of the multiple thresholds have the same value.

In some examples, thresholds of the multiple thresholds may have (and/or may be configured with) common values. For example, the first threshold value may be the same as the second threshold value. Alternatively and/or additionally, all thresholds of the multiple thresholds may be common, such as where each threshold of the multiple thresholds has the same value.

Alternatively and/or additionally, a UE may maintain (and/or may be configured with) one threshold (e.g., one threshold number of beam failure instance indications) for multiple TRPs (e.g., different TRPs) of a cell.

Alternatively and/or additionally, a UE may maintain (and/or may be configured with) one threshold (e.g., one threshold number of beam failure instance indications) for multiple BFD-RSs (e.g., different BFD-RSs) of a cell.

Alternatively and/or additionally, a UE may maintain (and/or may be configured with) one threshold (e.g., one threshold number of beam failure instance indications) for multiple groups of BFD-RSs (e.g., different groups of BFD-RSs) of a cell.

Alternatively and/or additionally, a UE may maintain (and/or may be configured with) one threshold (e.g., one threshold number of beam failure instance indications) for multiple activated TCI states for PDCCH of a cell (e.g., different activated TCI states for PDCCH of the cell).

Alternatively and/or additionally, a UE may maintain (and/or may be configured with) one threshold (e.g., one threshold number of beam failure instance indications) for multiple groups of activated TCI states for PDCCH of a cell (e.g., different groups of activated TCI states for PDCCH of the cell).

Alternatively and/or additionally, a UE may maintain (and/or may be configured with) one threshold (e.g., one threshold number of beam failure instance indications) for multiple CORESET pools (e.g., different CORESET pools) of a cell.

Alternatively and/or additionally, the UE may maintain multiple timers for multiple TRPs of a cell (e.g., the multiple TRPs may be different TRPs, such as where TRPs of the multiple TRPs are different from each other). The UE may start (and/or restart) a timer associated with a TRP in response to (and/or when) receiving a beam failure instance indication associated with the TRP. The UE may not start (and/or may not restart) a timer associated with a TRP in response to (and/or when) receiving a beam failure instance indication that is not associated with the TRP, such as in response to receiving a beam failure instance indication associated with one or more other TRPs different than the TRP. The UE may set a counter associated with the TRP to 0 in response to expiration (e.g., timer expiry) of the timer (and/or the UE may set the counter associated with the TRP to 0 when and/or if the timer expires). The counter may be associated with a number of beam failure instance indications, associated with the TRP, received from one or more lower layers (of the UE, for example, such as a physical layer of the UE). For example, a counter value of the counter may be indicative of the number of beam failure instance indications.

In an example, a UE may be configured with a first TRP and a second TRP of a cell. The UE may maintain a first timer for the first TRP and a second timer for the second TRP, respectively. The UE may start (and/or restart) the first timer in response to (and/or when) receiving a beam failure instance indication associated with the first TRP. The UE may not start (and/or may not restart) the second timer in response to (and/or when) receiving the beam failure instance indication associated with the first TRP.

Alternatively and/or additionally, the UE may maintain one or more timers for one or more BFD-RSs of a cell. The one or more BFD-RSs may comprise one, some and/or all BFD-RSs associated with the cell. For example, the one or more timers maintained by the UE may comprise a timer (e.g., one timer) for each BFD-RS of the one or more BFD-RSs, respectively. Each BFD-RS of the one or more BFD-RSs may be associated with a TRP of the cell. In some examples, different BFD-RSs of the one or more BFD-RSs may be associated with different TRPs of the cell (and/or more than one BFD-RS of the one or more BFD-RSs may not be associated with a same TRP of the cell). The UE may start and/or restart a timer (of the one or more timers, for example) associated with a BFD-RS (of the one or more BFD-RSs, for example) in response to (and/or when) receiving a beam failure instance indication associated with the BFD-RS. The UE may not start (and/or may not restart) a timer (of the one or more timers, for example) associated with a BFD-RS (of the one or more BFD-RSs, for example) in response to (and/or when) receiving a beam failure instance indication that is not associated with the BFD-RS (e.g., a beam failure instance indication that is associated with one or more other BFD-RSs, associated with the cell, different than the BFD-RS).

Alternatively and/or additionally, the UE may maintain one or more timers for one or more groups of BFD-RSs of a cell. The one or more groups of BFD-RSs may comprise one, some and/or all groups of BFD-RSs associated with the cell. For example, the one or more timers maintained by the UE may comprise a timer (e.g., one timer) for each group of BFD-RSs of the one or more groups of BFD-RSs, respectively. Each group of BFD-RSs of the one or more groups of BFD-RSs may be associated with a TRP of the cell. In some examples, different groups of BFD-RSs of the one or more groups of BFD-RSs may be associated with different TRPs of the cell (and/or more than one group of BFD-RSs of the one or more groups of BFD-RSs may not be associated with a same TRP of the cell). The UE may start and/or restart a timer (of the one or more timers, for example) associated with a group of BFD-RSs (of the one or more groups of BFD-RSs, for example) in response to (and/or when) receiving a beam failure instance indication associated with the group of BFD-RSs. The UE may not start (and/or may not restart) a timer (of the one or more timers, for example) associated with a group of BFD-RSs (of the one or more groups of BFD-RSs, for example) in response to (and/or when) receiving a beam failure instance indication that is not associated with the group of BFD-RSs (e.g., a beam failure instance indication that is associated with one or more other groups of BFD-RSs, associated with the cell, different than the group of BFD-RSs).

Alternatively and/or additionally, the UE may maintain one or more timers for one or more activated TCI states for PDCCH of a cell. The one or more activated TCI states for PDCCH may comprise one, some and/or all activated TCI states for PDCCH associated with the cell. For example, the one or more timers maintained by the UE may comprise a timer (e.g., one timer) for each activated TCI state for PDCCH of the one or more activated TCI states for PDCCH, respectively. Each activated TCI state for PDCCH of the one or more activated TCI states for PDCCH may be associated with a TRP of the cell. In some examples, different activated TCI states for PDCCH of the one or more activated TCI states for PDCCH may be associated with different TRPs of the cell (and/or more than one activated TCI state for PDCCH of the one or more activated TCI states for PDCCH may not be associated with a same TRP of the cell). The UE may start and/or restart a timer (of the one or more timers, for example) associated with an activated TCI state for PDCCH (of the one or more activated TCI states for PDCCH, for example) in response to (and/or when) receiving a beam failure instance indication associated with the activated TCI state for PDCCH. The UE may not start (and/or may not restart) a timer (of the one or more timers, for example) associated with an activated TCI state for PDCCH (of the one or more activated TCI states for PDCCH, for example) in response to (and/or when) receiving a beam failure instance indication that is not associated with the activated TCI state for PDCCH (e.g., a beam failure instance indication that is associated with one or more other activated TCI states for PDCCH, associated with the cell, different than the activated TCI state for PDCCH).

Alternatively and/or additionally, the UE may maintain one or more timers for one or more groups of activated TCI states for PDCCH of a cell. The one or more groups of activated TCI states for PDCCH may comprise one, some and/or all groups of activated TCI states for PDCCH associated with the cell. For example, the one or more timers maintained by the UE may comprise a timer (e.g., one timer) for each group of activated TCI states for PDCCH of the one or more groups of activated TCI states for PDCCH, respectively. Each group of activated TCI state for PDCCH of the one or more groups of activated TCI states for PDCCH may be associated with a TRP of the cell. In some examples, different groups of activated TCI states for PDCCH of the one or more groups of activated TCI states for PDCCH may be associated with different TRPs of the cell (and/or more than one group of activated TCI states for PDCCH of the one or more groups of activated TCI states for PDCCH may not be associated with a same TRP of the cell). The UE may start and/or restart a timer (of the one or more timers, for example) associated with a group of activated TCI state for PDCCH (of the one or more groups of activated TCI states for PDCCH, for example) in response to (and/or when) receiving a beam failure instance indication associated with the group of activated TCI state for PDCCH. The UE may not start (and/or may not restart) a timer (of the one or more timers, for example) associated with a group of activated TCI states for PDCCH (of the one or more groups of activated TCI states for PDCCH, for example) in response to (and/or when) receiving a beam failure instance indication that is not associated with the group of activated TCI states for PDCCH (e.g., a beam failure instance indication that is associated with one or more other groups of activated TCI states for PDCCH, associated with the cell, different than the group of activated TCI state for PDCCH).

Alternatively and/or additionally, the UE may maintain one or more timers for one or more CORESET pools of a cell. The one or more CORESET pools may comprise one, some and/or all CORESET pools associated with the cell. For example, the one or more timers maintained by the UE may comprise a timer (e.g., one timer) for each CORESET pool of the one or more CORESET pools, respectively. Each CORESET pool of the one or more CORESET pools may be associated with a TRP of the cell. In some examples, different CORESET pools of the one or more CORESET pools may be associated with different TRPs of the cell (and/or more than one CORESET pool of the one or more CORESET pools may not be associated with a same TRP of the cell). The UE may start and/or restart a timer (of the one or more timers, for example) associated with a CORESET pool (of the one or more CORESET pools, for example) in response to (and/or when) receiving a beam failure instance indication associated with the CORESET pool. The UE may not start (and/or may not restart) a timer (of the one or more timers, for example) associated with a CORESET pool (of the one or more CORESET pools, for example) in response to (and/or when) receiving a beam failure instance indication that is not associated with the CORESET pool (e.g., a beam failure instance indication that is associated with one or more other CORESET pools, associated with the cell, different than the CORESET pool).

Alternatively and/or additionally, the UE may set a counter associated with a TRP of a cell to zero in response to completion of a BFR procedure (e.g., triggering a BFR) associated with the TRP (and/or the UE may set the counter associated with the TRP to zero when the BFR procedure associated with the TRP is completed). For example, the UE may only set the counter associated with the TRP to zero in response to completion of the BFR procedure (e.g., triggering a BFR) associated with the TRP (and/or the UE may only set the counter associated with the TRP to zero when the BFR procedure associated with the TRP is completed). Alternatively and/or additionally, the UE may set the counter associated with the TRP to zero in response to cancellation of a triggered and/or pending BFR associated with the TRP.

Alternatively and/or additionally, the UE may set a timer associated with the TRP to zero in response to completion of a BFR procedure associated with the TRP (and/or the UE may set the timer associated with the TRP to zero when the BFR procedure associated with the TRP is completed). For example, the UE may only set the timer associated with the TRP to zero in response to completion of the BFR procedure associated with the TRP (and/or the UE may only set the timer associated with the TRP to zero when the BFR procedure associated with the TRP is completed).

Alternatively and/or additionally, the UE may set the counter associated with the TRP to zero in response to (and/or when) receiving a PDCCH, addressed to C-RNTI, indicating an uplink (UL) grant for a new transmission for a Hybrid Automatic Repeat Request (HARQ) process. For example, the UE may only set the counter associated with the TRP to zero in response to (and/or when) receiving a PDCCH, addressed to C-RNTI, indicating an uplink grant for a new transmission for a HARQ process. The HARQ process may be used to transmit a BFR MAC CE (or a truncated BFR MAC CE) comprising BFR information of the TRP (of the cell).

In some examples, the UE may not set a second counter associated with another TRP of the cell (different than the TRP of the cell) to zero when the counter associated with the TRP is set to zero. The UE may not set a second timer associated with another TRP of the cell (different than the TRP of the cell) to zero when the timer associated with the TRP is set to zero.

In an example, the UE may not set a first counter associated with a first TRP of a cell to zero in response to completion of a BFR procedure of the cell if the BFR procedure is initiated (e.g., triggered) in response to a beam failure instance indication associated with a second TRP of the cell (and/or the UE may not set the first counter associated with the first TRP of the cell to zero in response to completion of the BFR procedure that is initiated in response to the beam failure instance indication associated with the second TRP). In an example in which the BFR procedure is initiated in response to the beam failure instance indication associated with the second TRP, the BFR procedure may not be associated with (e.g., related to) the first TRP. For example, the BFR procedure may not be associated with the first TRP since the BFR procedure is not initiated based on the first TRP (e.g., the first counter associated with the first TRP is smaller than the threshold when the BFR procedure is initiated and/or performed). Alternatively and/or additionally, the BFR procedure may not be associated with the first TRP since the first TRP does not fail (e.g., the counter associated with the first TRP is smaller than the threshold). In some examples, a BFR MAC CE (of the BFR procedure, for example) may not indicate beam failure information associated with the first TRP of the cell (such as due to the BFR procedure not being associated with the first TRP and/or due to the BFR procedure not being initiated based on the first TRP).

Alternatively and/or additionally, a counter may be associated with a set of BFR-DSs of a cell (e.g., a set of one or more BFR-DSs, of the cell, comprising a BFR-DS and/or a group of BFR-DSs). The UE may set the counter associated with the set of BFR-DSs of the cell to zero in response to completion of a BFR procedure associated with beam failure instance indication associated with the set of BFR-DSs (e.g., the BFR procedure may be initiated for beam failure instance indication associated with the set of BFR-DSs). The UE may not set a counter associated with the set of BFR-DSs of the cell to zero in response to completion of a BFR procedure associated with beam failure instance indication associated with a second set of BFR-DSs, of the cell, different than the set of BFR-DSs of the cell (e.g., the BFR procedure may be initiated for beam failure instance indication associated with the second set of BFR-DSs, wherein the second set of BFR-DSs may be a set of one or more BFR-DSs, of the cell, comprising a BFR-DS and/or a group of BFR-DSs). In an example in which the BFR procedure is initiated for beam failure instance indication associated with the second set of BFR-DSs, the BFR procedure may not be associated with (e.g., related to) the set of BFR-DSs. For example, the BFR procedure may not be associated with the set of BFR-DSs since the BFR procedure is not initiated in response to the set of BFR-DSs failing (e.g., the counter associated with the set of BFR-DSs is smaller than the threshold when the BFR procedure is initiated and/or performed). Alternatively and/or additionally, the BFR procedure may not be associated with the set of BFR-DSs since the set of BFR-DSs does not fail (e.g., the counter associated with the set of BFR-DSs is smaller than the threshold).

Alternatively and/or additionally, a counter may be associated with a CORESET pool of a cell. The UE may set the counter associated with the CORESET pool of the cell to zero in response to completion of a BFR procedure associated with beam failure instance indication associated with the CORESET pool (e.g., the BFR procedure may be initiated for beam failure instance indication associated with the CORESET pool). The UE may not set a counter associated with the CORESET pool of the cell to zero in response to completion of a BFR procedure associated with beam failure instance indication associated with a second CORESET pool, of the cell, different than the CORESET pool of the cell (e.g., the BFR procedure may be initiated for beam failure instance indication associated with the second CORESET pool). In an example in which the BFR procedure is initiated for beam failure instance indication associated with the second CORESET pool, the BFR procedure may not be associated with (e.g., related to) the CORESET pool. For example, the BFR procedure may not be associated with the CORESET pool since the BFR procedure is not initiated based on CORESET pool (e.g., the counter associated with the CORESET pool is smaller than the threshold when the BFR procedure is initiated and/or performed). Alternatively and/or additionally, the BFR procedure may not be associated with the CORESET pool since the CORESET pool does not fail (e.g., the counter associated with the CORESET pool is smaller than the threshold).

A BFR procedure (such as discussed with respect to one or more embodiments provided herein) may comprise triggering a BFR. Completion of the BFR procedure may correspond to reception of a PDCCH, wherein the PDCCH indicates an uplink grant for a transmission (e.g., a new transmission) of a HARQ process, wherein the HARQ process is used for transmitting a BFR MAC CE indicating beam failure information associated with a TRP (e.g., a failed TRP), a BFR-DS (e.g., a failed BFR-DS), a group of BFR-DSs (e.g., a failed group of BFR-DSs), and/or a CORESET pool (e.g., a failed CORESET pool).

Alternatively and/or additionally, the BFR procedure may be a random access procedure initiated for BFR (e.g., BFR for a TRP, such as a failed TRP), such as BFR of a SpCell. The completion of the BFR procedure may correspond to completion of the random access procedure and/or reception of a PDCCH, wherein the PDCCH indicates an uplink grant for a transmission (e.g., a new transmission) of a HARQ process, wherein the HARQ process is used for transmitting a BFR MAC CE indicating beam failure information associated with the TRP (e.g., the failed TRP).

Alternatively and/or additionally, the UE may set counters of multiple counters of a cell (e.g., all counters of the multiple counters of the cell) to zero in response to deactivation of the cell. The multiple counters may comprise counters that the UE maintains for at least one of TRPs, BFR-DSs, activated TCI states for PDCCH, CORESET pools, etc. of the cell (e.g., the multiple counters may comprise all counters that the UE maintains for at least one of TRPs, BFR-DSs, activated TCI states for PDCCH, CORESET pools, etc. of the cell). Alternatively and/or additionally, the UE may set counters of the multiple counters of the cell (e.g., all counters of the multiple counters of the cell) to zero in response to MAC reset of the MAC entity associated with the cell.

Alternatively and/or additionally, the BFR procedure may comprise initiating a random access procedure for BFR (e.g., SpCell BFR), such as a random access procedure for BFR for a TRP (e.g., a failed TRP), a BFR-DS (e.g., a failed BFR-DS), a group of BFR-DSs (e.g., a failed group of BFR-DSs), and/or a CORESET pool (e.g., a failed CORESET pool). The completion of the BFR procedure may correspond to completion of the random access procedure (e.g., the BFR procedure may be considered to be complete when the random access procedure is completed). The UE may set counters of the multiple counters of the cell (e.g., all counters of the multiple counters of the cell) to zero in response to completion of the BFR procedure, wherein the BFR procedure comprises initiating the random access procedure for BFR (e.g., SpCell BFR) of the cell. Alternatively and/or additionally, the UE may set counters of the multiple counters of the cell (e.g., all counters of the multiple counters of the cell) of the cell to zero in response to completion of the random access procedure initiated for BFR (e.g., SpCell BFR) of the cell. In some examples, the UE initiates the random access procedure (e.g., the random access procedure initiated for BFR, such as SpCell BFR, of the cell) when two TRPs of the cell fail (and/or in response to two TRPs of the cell failing), such as when two counters (e.g., two counters, such as all counters of the multiple counters, associated with the two TRPs) are equal to or larger than corresponding thresholds, respectively (e.g., a first counter of the two counters is equal to or larger than a first threshold associated with the first counter and a second counter of the two counters is equal to or larger than a second threshold associated with the second counter).

Alternatively and/or additionally, the UE may set counters of the multiple counters of the cell (e.g., all counters of the multiple counters of the cell) to zero in response to reconfiguration of beamFailureDetectionTimer, reconfiguration of beamFailureInstanceMaxCount, and/or reconfiguration of one or more reference signals used for beam failure detection of the cell (e.g., the one or more reference signals may comprise any of the reference signals used for beam failure detection of the cell).

Figure 7:
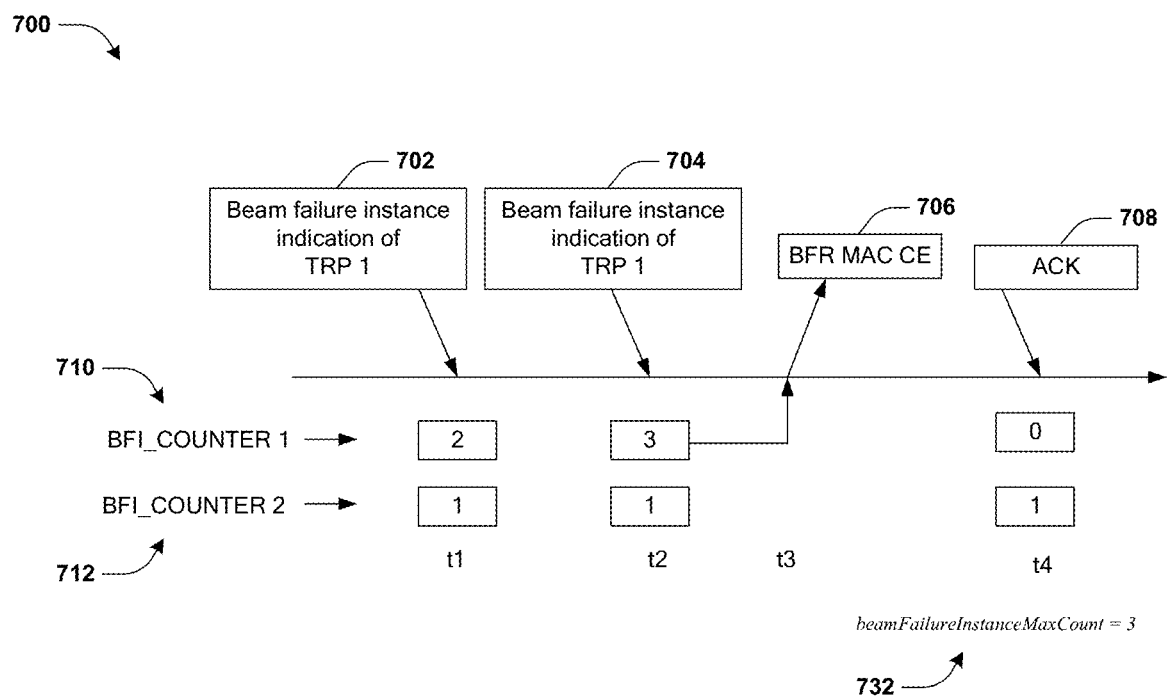
FIG. 7 is a diagram illustrating an exemplary scenario associated with a UE configured with multi-Transmission/Reception Point (TRP) operation according to one exemplary embodiment.

FIG. 7 illustrates an exemplary scenario 700 associated with a UE configured with multi-TRP operation. For example, the UE may be configured with multi-TRP operation on a SpCell with TRP 1 and TRP 2 (e.g., TRP 1 may be a first TRP of the SpCell and TRP 2 may be a second TRP of the SpCell). The UE is configured with a threshold 732 (e.g., beamFailureInstanceMaxCount), with a value of 3, for both TRP 1 and TRP 2. The UE maintains and/or is configured with two counters for beam failure detection, where each counter of the two counters is associated with a TRP of the two TRPs. For example, the two counters (e.g., beam failure instance (BFI) counters) may comprise BFI_COUNTER 1 (shown with reference number 710) associated with TRP 1 and BFI_COUNTER 2 (shown with reference number 712) associated with TRP 2. When the UE receives a first beam failure instance indication of TRP 1 (shown with reference number 702) at timing t1 (and/or in response to receiving the first beam failure instance indication of TRP 1 at timing t1), the UE increments BFI_COUNTER 1 by 1 (e.g., the UE changes a counter value of BFI_COUNTER 1 from 1 to 2). At timing t2, the UE receives a second beam failure instance indication of TRP 1 (shown with reference number 704). When the UE receives the second beam failure instance indication of TRP 1 (and/or in response to receiving the second beam failure instance indication of TRP 1), the UE increments BFI_COUNTER 1 by 1 (e.g., the UE changes the counter value of BFI_COUNTER 1 from 2 to 3). Based on (e.g., in response to) the BFI_COUNTER 1 being larger than or equal to the threshold 732 (e.g., beamFailureInstanceMaxCount), the UE triggers a BFR associated with TRP 1 and performs a BFR procedure. For example, the UE generates and transmits a BFR MAC CE 706 indicating beam failure information of TRP 1 (and not indicating beam failure information of TRP 2, for example) to a network at timing t3. The UE may generate and transmit the BFR MAC CE 706 as part of the BFR procedure. The network transmits an acknowledgement (ACK) 708 to the UE at timing t4. The acknowledgement 708 may be an uplink grant for a transmission (e.g., a new transmission) associated with a HARQ process used to transmit the BFR MAC CE 706. In response to the acknowledgement 708, the UE may consider the BFR procedure to be complete and may set the BFI_COUNTER 1 to zero (e.g., set the counter value of the BFI_COUNTER 1 to zero), and the UE may not set the BFI_COUNTER 2 to zero (e.g., a counter value of the BFI_COUNTER 2 remains equal to 1).

Figure 8:
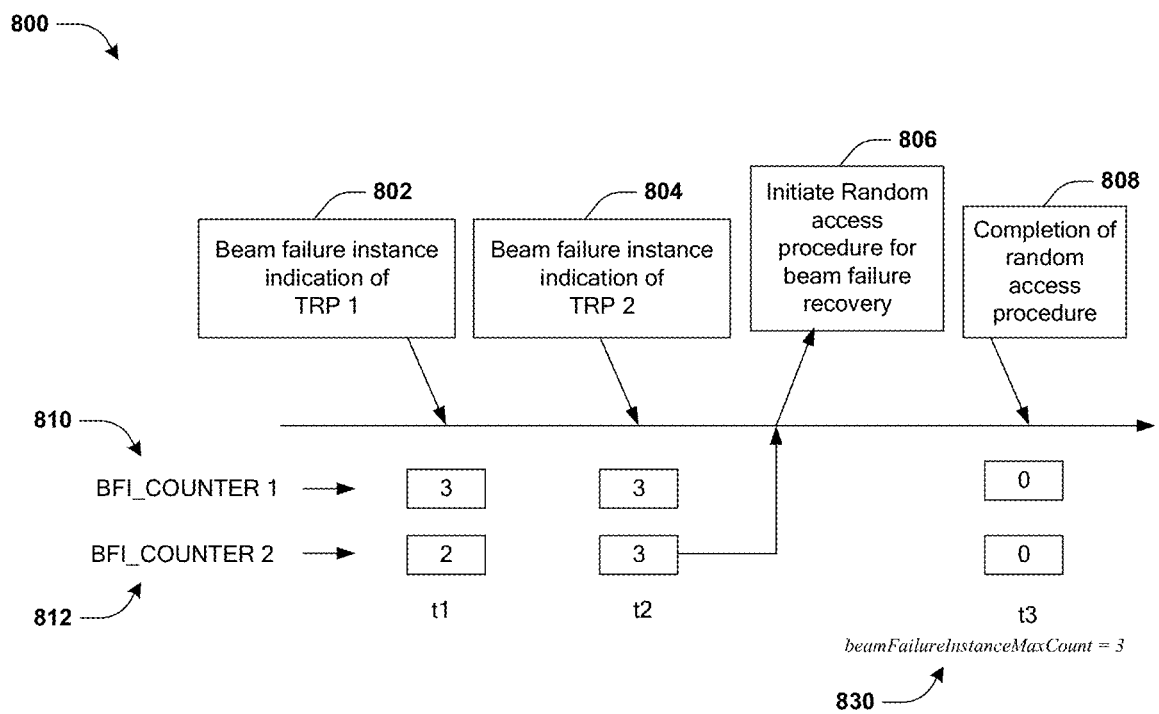
FIG. 8 is a diagram illustrating an exemplary scenario associated with a UE configured with multi-TRP operation according to one exemplary embodiment.

FIG. 8 illustrates an exemplary scenario 800 associated with a UE configured with multi-TRP operation. For example, the UE may be configured with multi-TRP operation on a SpCell with TRP 1 and TRP 2 (e.g., TRP 1 may be a first TRP of the SpCell and TRP 2 may be a second TRP of the SpCell). The UE is configured with a threshold 830 (e.g., beamFailureInstanceMaxCount), with a value of 3, for both TRP 1 and TRP 2. The UE maintains and/or is configured with two counters for beam failure detection, where each counter of the two counters is associated with a TRP of the two TRPs. For example, the two counters may comprise BFI_COUNTER 1 (shown with reference number 810) associated with TRP 1 and BFI_COUNTER 2 (shown with reference number 812) associated with TRP 2. When the UE receives a first beam failure instance indication of TRP 1 (shown with reference number 802) at timing t1 (and/or in response to receiving the first beam failure instance indication of TRP 1 at timing t1), the UE increments BFI_COUNTER 1 by 1 (e.g., the UE changes a counter value of BFI_COUNTER 1 from 2 to 3). Based on (e.g., in response to) the BFI_COUNTER 1 being larger than or equal to the threshold 830 (e.g., beamFailureInstanceMaxCount), the UE may trigger a BFR for TRP 1. At timing t2, the UE receives a second beam failure instance indication of the TRP 2 (shown with reference number 804). When the UE receives the second beam failure instance indication of TRP 2 (and/or in response to receiving the second beam failure instance indication of TRP 2), the UE increments BFI_COUNTER 2 by 1 (e.g., the UE changes a counter value of BFI_COUNTER 2 from 2 to 3). Based on (e.g., in response to) the BFI_COUNTER 2 (and BFI_COUNTER 1, for example) being larger than or equal to the threshold 830 (e.g., beamFailureInstanceMaxCount), the UE may initiate 806 a random access procedure (for SpCell BFR, for example) to a network. At timing t3, in response to completion 808 of the random access procedure, the UE may set the BFI_COUNTER 1 to zero and BFI_COUNTER 2 to zero (e.g., the UE sets the counter value of the BFI_COUNTER 1 to zero and sets the counter value of the BFI_COUNTER 2 to zero).

In some examples, in response to switching from multi-TRP operation to single-TRP operation for a cell, the UE may reset a counter of the cell.

With respect to one or more embodiments herein, such as one or more techniques, devices, concepts, methods and/or alternatives described above, a beam failure instance indication associated with a CORESET pool may correspond to (and/or may be an indication of) a beam failure instance associated with a PDCCH (e.g., a PDCCH reception) on a CORESET, wherein the CORESET is in the CORESET pool. In an example, the CORESET pool that the CORESET is in (e.g., the CORESET pool to which the CORESET belongs) may be indicated by a configuration (e.g., coresetPoolIndex) that is configured by a network (e.g., the UE may be configured with the configuration by the network, and/or the UE may identify the CORESET pool associated with the CORESET based on the configuration).

With respect to one or more embodiments herein, a BFD-RS of a cell and/or TRP may be RadioLinkMonitoringRS indicated and/or configured by a network (for beam failure detection, for example). Alternatively and/or additionally, the BFD-RS may be associated with a reference signal for PDCCH reception of the cell and/or TRP.

With respect to one or more embodiments herein, the counter may be BFI_COUNTER. For example, each counter of one, some and/or all of the multiple counters may be BFI_COUNTER. The counter may indicate the number of beam failure instance indications received (during a period of time, such as a defined period of time, for example).

With respect to one or more embodiments herein, the cell may be a PCell and/or a SpCell of the UE. Alternatively and/or additionally, the cell may be a SCell of the UE.

With respect to one or more embodiments herein, the first TRP and the second TRP may be associated with a same cell. Alternatively and/or additionally, the first TRP and the second TRP may be associated with different cells (such as where the first TRP is associated with a first cell and the second TRP is associated with a second cell different than the first cell).

With respect to one or more embodiments herein, the lower layers may contain a physical layer of the UE.

With respect to one or more embodiments herein, the timer may be beamFailureDetectionTimer. For example, each timer of one, some and/or all of the multiple timers may be beamFailureDetectionTimer.

With respect to one or more embodiments herein, the threshold may be beamFailureInstanceMaxCount. For example, each threshold of one, some and/or all of the multiple thresholds may be beamFailureInstanceMaxCount.

With respect to one or more embodiments herein, "zero" may be replaced with a different value, such as a defined value. For example, the defined value may be a value with which the UE is configured (e.g., 1, 2, 3, etc.). For example, rather than setting a counter to zero in response to completion of a BFR procedure, the counter may be set to the defined value.

To enhance 3GPP specification for wireless communication in accordance with some embodiments herein, Enhancements 1-2 are provided herein. Enhancements 1-2 are reflective of implementation in accordance with some embodiments herein, and comprise additions to Section 5.17 of 3GPP TS 38.321, V16.1.0. According to some embodiments, one and/or both of Enhancements 1-2 may be implemented and/or a portion of one and/or both of Enhancements 1-2 may be implemented. An original portion of Section 5.17 of 3GPP TS 38.321, V16.1.0, without any additions of Enhancements 1-2, is quoted below:

The MAC entity shall for each Serving Cell configured for beam failure detection:
1> if beam failure instance indication has been received from lower layers:
  2> start or restart the beamFailureDetectionTimer;
  2> increment BFI_COUNTER by 1;
  2> if BFI_COUNTER>=beamFailureInstanceMaxCount:
    3> if the Serving Cell is SCell:
      4> trigger a BFR for this Serving Cell;
    3> else:
      4> initiate a Random Access procedure (see clause 5.1) on the SpCell.
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
  2> set BFI_COUNTER to 0.
1> if the Serving Cell is SpCell and the Random Access procedure initiated for SpCell beam failure recovery is successfully completed (see clause 5.1):
  2> set BFI_COUNTER to 0;
  2> stop the beamFailureRecoveryTimer, if configured;
  2> consider the Beam Failure Recovery procedure successfully completed.
1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
1> if the SCell is deactivated as specified in clause 5.9:
  2> set BFI_COUNTER to 0;
  2> consider the Beam Failure Recovery procedure successfully completed and cancel all the triggered BFRs for this Serving Cell.

In Enhancement 1, additions 1-8 are made to the original portion of Section 5.17 of 3GPP TS 38.321, V16.1.0 in accordance with some embodiments of the present disclosure. To distinguish additions 1-8 from what is originally included in the original portion of Section 5.17 of 3GPP TS 38.321, V16.1.0: (i) addition 1 is in bold, and is preceded by the term "ADDITION 1 STARTS:" and followed by the term "ADDITION 1 ENDS", (ii) addition 2 is in bold, and is preceded by the term "ADDITION 2 STARTS:" and followed by the term "ADDITION 2 ENDS", (iii) addition 3 is in bold, and is preceded by the term "ADDITION 3 STARTS:" and followed by the term "ADDITION 3 ENDS", (iv) addition 4 is in bold, and is preceded by the term "ADDITION 4 STARTS:" and followed by the term "ADDITION 4 ENDS", (v) addition 5 is in bold, and is preceded by the term "ADDITION 5 STARTS:" and followed by the term "ADDITION 5 ENDS", (vi) addition 6 is in bold, and is preceded by the term "ADDITION 6 STARTS:" and followed by the term "ADDITION 6 ENDS", (vii) addition 7 is in bold, and is preceded by the term "ADDITION 7 STARTS:" and followed by the term "ADDITION 7 ENDS", and (viii) addition 8 is in bold, and is preceded by the term "ADDITION 8 STARTS:" and followed by the term "ADDITION 8 ENDS".

Enhancement 1:

The MAC entity shall for each Serving Cell configured for beam failure detection:
1> if beam failure instance indication ADDITION 1 STARTS: associated with a CORESET pool ADDITION 1 ENDS has been received from lower layers:
  2> start or restart the beamFailureDetectionTimer ADDITION 2 STARTS: associated with the CORESET pool ADDITION 2 ENDS;
  2> increment BFI_COUNTER ADDITION 3 STARTS: associated with the CORESET pool ADDITION 3 ENDS by 1;
  2> if BFI_COUNTER>=beamFailureinstanceMaxCount:
    3> if the Serving Cell is SCell:
      4> trigger a BFR for this Serving Cell;
    3> else:
      4> initiate a Random Access procedure (see clause 5.1) on the SpCell.
1> if the beamFailureDetectionTimer ADDITION 4 STARTS: associated with the CORESET pool ADDITION 4 ENDS expires; or
1> if beamFailureDetectionTimer, beamFailureinstanceMaxCount, or any of the reference signals used for beam failure detection is reconfigured by upper layers associated with this Serving Cell:
  2> set BFI_COUNTER ADDITION 5 STARTS: associated with the CORESET pool ADDITION 5 ENDS to 0.
1> if the Serving Cell is SpCell and the Random Access procedure initiated for SpCell beam failure recovery is successfully completed (see clause 5.1):
  2> set BFI_COUNTER to 0 ADDITION 6 STARTS: for all CORESET pools ADDITION 6 ENDS;
  2> stop the beamFailureRecoveryTimer ADDITION 7 STARTS: for all CORESET pools ADDITION 7 ENDS, if configured;
  2> consider the Beam Failure Recovery procedure successfully completed.
1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
1> if the SCell is deactivated as specified in clause 5.9:
  2> set BFI_COUNTER to 0 ADDITION 8 STARTS: for all CORESET pools ADDITION 8 ENDS;
  2> consider the Beam Failure Recovery procedure successfully completed and cancel all the triggered BFRs for this Serving Cell.

For clarity, a version of Enhancement 1 is provided without indications of the beginnings and endings of additions 1-8:

The MAC entity shall for each Serving Cell configured for beam failure detection:
1> if beam failure instance indication associated with a CORESET pool has been received from lower layers:
  2> start or restart the beamFailureDetectionTimer associated with the CORESET pool;
  2> increment BFI_COUNTER associated with the CORESET pool by 1;
  2> if BFI_COUNTER>=beamFailureInstanceMaxCount:
    3> if the Serving Cell is SCell:
      4> trigger a BFR for this Serving Cell;
    3> else:
      4> initiate a Random Access procedure (see clause 5.1) on the SpCell.
1> if the beamFailureDetectionTimer associated with the CORESET pool expires; or
1> if beamFailureDetectionTimer, beamFailureInstanceMaxCount, or any of the reference signals used for beam failure detection is reconfigured by upper layers associated with this Serving Cell:
  2> set BFI_COUNTER associated with the CORESET pool to 0.
1> if the Serving Cell is SpCell and the Random Access procedure initiated for SpCell beam failure recovery is successfully completed (see clause 5.1):
  2> set BFI_COUNTER to 0 for all CORESET pools;
  2> stop the beamFailureRecoveryTimer for all CORESET pools, if configured;
  2> consider the Beam Failure Recovery procedure successfully completed.
1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
1> if the SCell is deactivated as specified in clause 5.9:
  2> set BFI_COUNTER to 0 for all CORESET pools;
  2> consider the Beam Failure Recovery procedure successfully completed and cancel all the triggered BFRs for this Serving Cell.

It may be appreciated that, in Enhancement 1, instances of "all CORESET pools" may be replaced with "one, some and/or all CORESET pools" and/or "one, some and/or all CORESET pools that are associated with the serving cell".

In Enhancement 2, additions 9-16 are made to the original portion of Section 5.17 of 3GPP TS 38.321, V16.1.0 in accordance with some embodiments of the present disclosure. To distinguish additions 9-16 from what is originally included in the original portion of Section 5.17 of 3GPP TS 38.321, V16.1.0: (i) addition 9 is in bold, and is preceded by the term "ADDITION 9 STARTS:" and followed by the term "ADDITION 9 ENDS", (ii) addition 10 is in bold, and is preceded by the term "ADDITION 10 STARTS:" and followed by the term "ADDITION 10 ENDS", (iii) addition 11 is in bold, and is preceded by the term "ADDITION 11 STARTS:" and followed by the term "ADDITION 11 ENDS", (iv) addition 12 is in bold, and is preceded by the term "ADDITION 12 STARTS:" and followed by the term "ADDITION 12 ENDS", (v) addition 13 is in bold, and is preceded by the term "ADDITION 13 STARTS:" and followed by the term "ADDITION 13 ENDS", (vi) addition 14 is in bold, and is preceded by the term "ADDITION 14 STARTS:" and followed by the term "ADDITION 14 ENDS", (vii) addition 15 is in bold, and is preceded by the term "ADDITION 15 STARTS:" and followed by the term "ADDITION 15 ENDS", and (viii) addition 16 is in bold, and is preceded by the term "ADDITION 16 STARTS:" and followed by the term "ADDITION 16 ENDS".

Enhancement 2:

The MAC entity shall for each Serving Cell configured for beam failure detection:
1> if beam failure instance indication ADDITION 9 STARTS: associated with a beam failure detection reference signal ADDITION 9 ENDS has been received from lower layers:
  2> start or restart the beamFailureDetectionTimer ADDITION 10 STARTS: associated with the beam failure detection reference signal ADDITION 10 ENDS;
  2> increment BFI_COUNTER ADDITION 11 STARTS: associated with the beam failure detection reference signal ADDITION 11 ENDS by 1;
  2> if BFI_COUNTER>=beamFailureInstanceMaxCount:
    3> if the Serving Cell is SCell:
      4> trigger a BFR for this Serving Cell;
    3> else:
      4> initiate a Random Access procedure (see clause 5.1) on the SpCell.
1> if the beamFailureDetectionTimer ADDITION 12 STARTS: associated with the beam failure detection reference signal ADDITION 12 ENDS expires; or
1> if beamFailureDetectionTimer, beamFailureInstanceMaxCount, or any of the reference signals used for beam failure detection is reconfigured by upper layers associated with this Serving Cell:
  2> set BFI_COUNTER ADDITION 13 STARTS: associated with the beam failure detection reference signal ADDITION 13 ENDS to 0.
1> if the Serving Cell is SpCell and the Random Access procedure initiated for SpCell beam failure recovery is successfully completed (see clause 5.1):
  2> set BFI_COUNTER to 0 ADDITION 14 STARTS: for all beam failure detection reference signals ADDITION 14 ENDS;
  2> stop the beamFailureRecoveryTimer ADDITION 15 STARTS: for all beam failure detection reference signals ADDITION 15 ENDS, if configured;
  2> consider the Beam Failure Recovery procedure successfully completed.
1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
1> if the SCell is deactivated as specified in clause 5.9:
  2> set BFI_COUNTER to 0 ADDITION 16 STARTS: for all beam failure detection reference signals ADDITION 16 ENDS;
  2> consider the Beam Failure Recovery procedure successfully completed and cancel all the triggered BFRs for this Serving Cell.

For clarity, a version of Enhancement 2 is provided without indications of the beginnings and endings of additions 9-16:

The MAC entity shall for each Serving Cell configured for beam failure detection:
1> if beam failure instance indication associated with a beam failure detection reference signal has been received from lower layers:
  2> start or restart the beamFailureDetectionTimer associated with the beam failure detection reference signal;
  2> increment BFI_COUNTER associated with the beam failure detection reference signal by 1;
  2> if BFI_COUNTER>=beamFailureInstanceMaxCount:
    3> if the Serving Cell is SCell:
      4> trigger a BFR for this Serving Cell;
    3> else:
      4> initiate a Random Access procedure (see clause 5.1) on the SpCell.
1> if the beamFailureDetectionTimer associated with the beam failure detection reference signal expires; or
1> if beamFailureDetectionTimer, beamFailureInstanceMaxCount, or any of the reference signals used for beam failure detection is reconfigured by upper layers associated with this Serving Cell:
  2> set BFI_COUNTER associated with the beam failure detection reference signal to 0.
1> if the Serving Cell is SpCell and the Random Access procedure initiated for SpCell beam failure recovery is successfully completed (see clause 5.1):
  2> set BFI_COUNTER to 0 for all beam failure detection reference signals;
  2> stop the beamFailureRecoveryTimer for all beam failure detection reference signals, if configured;
  2> consider the Beam Failure Recovery procedure successfully completed.
1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
1> if the SCell is deactivated as specified in clause 5.9:
  2> set BFI_COUNTER to 0 for all beam failure detection reference signals;
  2> consider the Beam Failure Recovery procedure successfully completed and cancel all the triggered BFRs for this Serving Cell.

It may be appreciated that, in Enhancement 2, instances of "all beam failure detection reference signals" may be replaced with "one, some and/or all beam failure detection reference signals (BFD-RSs)" and/or "one, some and/or all beam failure detection reference signals (BFD-RSs) that are associated with the serving cell".

One, some and/or all of the foregoing techniques and/or embodiments can be formed to a new embodiment.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 9:
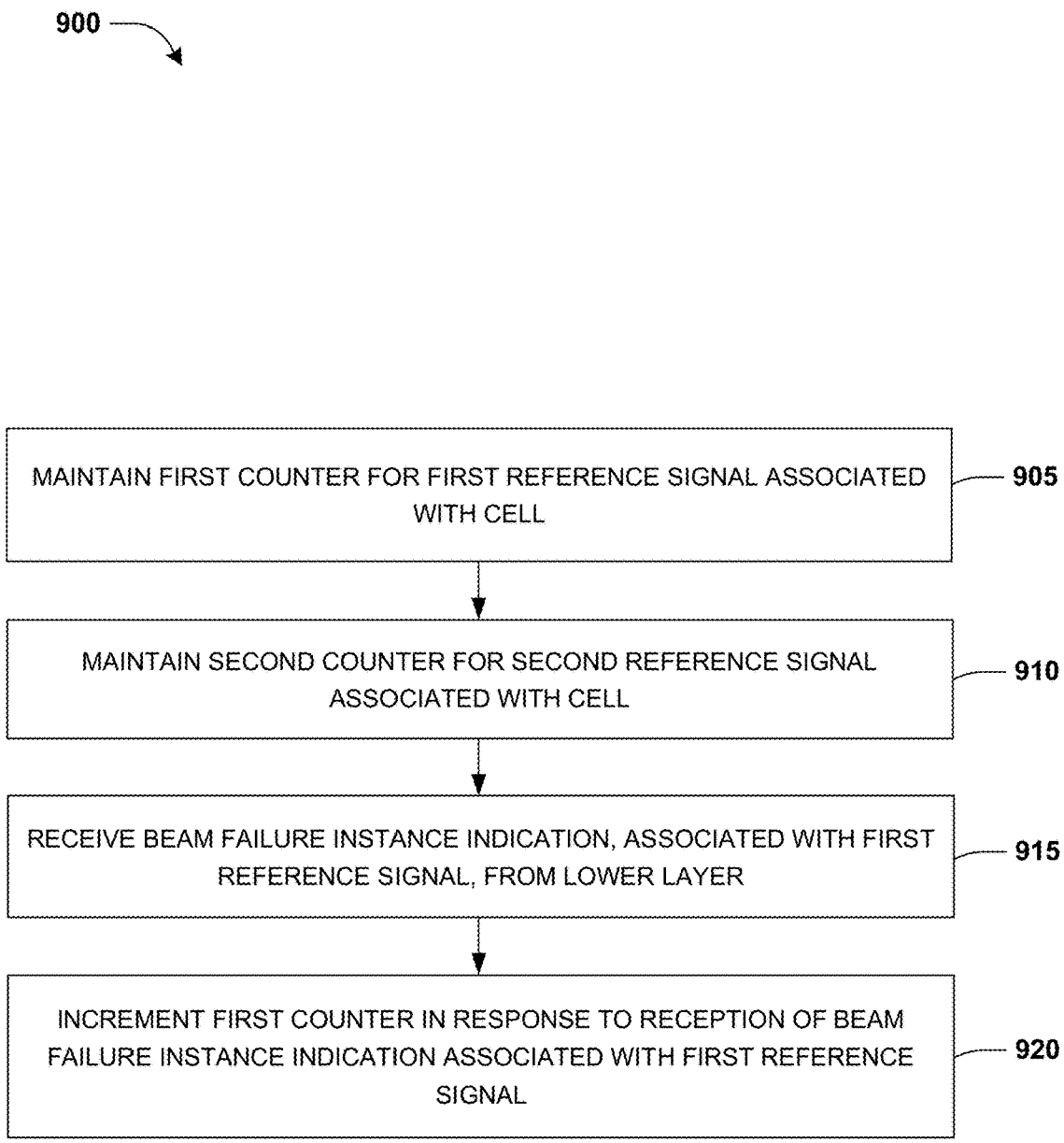
FIG. 9 is a flow chart according to one exemplary embodiment.

FIG. 9 is a flow chart 900 according to one exemplary embodiment from the perspective of a UE. In step 905, the UE maintains a first counter for a first reference signal associated with a cell. In step 910, the UE maintains a second counter for a second reference signal associated with the cell. In step 915, the UE receives a beam failure instance indication, associated with the first reference signal, from a lower layer (e.g., a physical layer of the UE). In step 920, the UE increments the first counter in response to the reception of the beam failure instance indication associated with the first reference signal. For example, the UE may increment the first counter by one in response to the reception of the beam failure instance indication associated with the first reference signal. For example, the UE may increment the first counter in response to the reception of the beam failure instance indication based on the beam failure instance indication being associated with the first reference signal.

In one embodiment, the UE does not increment the second counter (for the second reference signal) in response to the reception of the beam failure instance indication. For example, the UE may not increment the second counter in response to the reception of the beam failure instance indication based on the beam failure instance indication being associated with the first reference signal.

Referring back to FIGS. 3 and 4, in one exemplary embodiment of a UE, the device 300 includes a program code 312 stored in the memory 310. The CPU 308 may execute program code 312 to enable the UE (i) to maintain a first counter for a first reference signal associated with a cell, (ii) to maintain a second counter for a second reference signal associated with the cell, (iii) to receive a beam failure instance indication, associated with the first reference signal, from a lower layer, and (iv) to increment (e.g., increment by one) the first counter in response to the reception of the beam failure instance indication associated with the first reference signal. Furthermore, the CPU 308 can execute the program code 312 to perform one, some and/or all of the above-described actions and steps and/or others described herein.

Figure 10:
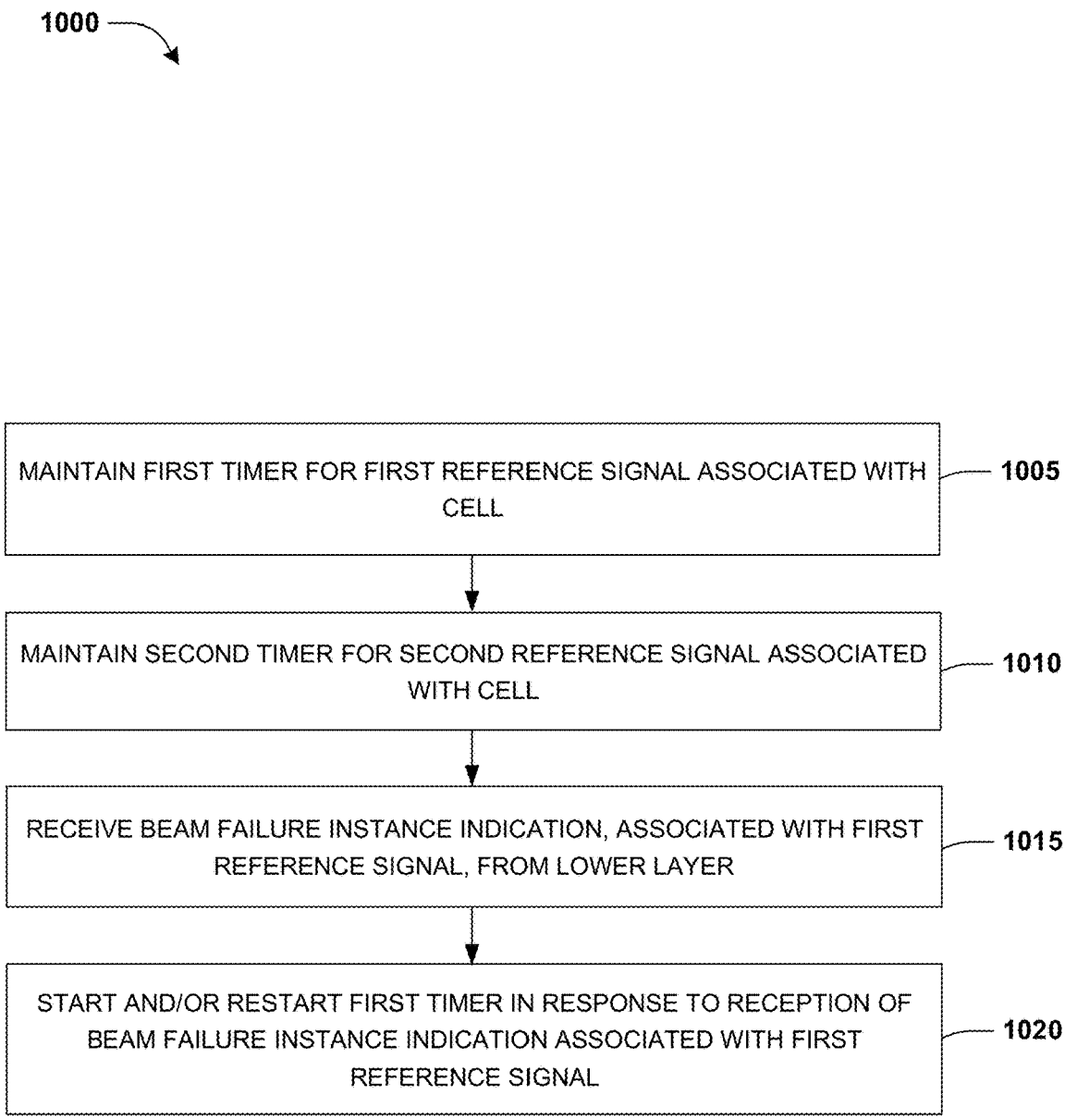
FIG. 10 is a flow chart according to one exemplary embodiment.

FIG. 10 is a flow chart 1000 according to one exemplary embodiment from the perspective of a UE. In step 1005, the UE maintains a first timer for a first reference signal associated with a cell. In step 1010, the UE maintains a second timer for a second reference signal associated with the cell. In step 1015, the UE receives a beam failure instance indication, associated with the first reference signal, from a lower layer (e.g., a physical layer of the UE). In step 1020, the UE starts and/or restarts the first timer in response to the reception of the beam failure instance indication associated with the first reference signal. For example, the UE may start and/or restart the first timer in response to the reception of the beam failure instance indication based on the beam failure instance indication being associated with the first reference signal.

In one embodiment, the UE does not start and/or does not restart the second timer (for the second reference signal) in response to the reception of the beam failure instance indication. For example, the UE may not start and/or may not restart the second timer in response to the reception of the beam failure instance indication based on the beam failure instance indication being associated with the first reference signal.

Referring back to FIGS. 3 and 4, in one exemplary embodiment of a UE, the device 300 includes a program code 312 stored in the memory 310. The CPU 308 may execute program code 312 to enable the UE (i) to maintain a first timer for a first reference signal associated with a cell, (ii) to maintain a second timer for a second reference signal associated with the cell, (iii) to receive a beam failure instance indication, associated with the first reference signal, from a lower layer, and (iv) to start and/or restart the first timer in response to the reception of the beam failure instance indication associated with the first reference signal. Furthermore, the CPU 308 can execute the program code 312 to perform one, some and/or all of the above-described actions and steps and/or others described herein.

Figure 11:
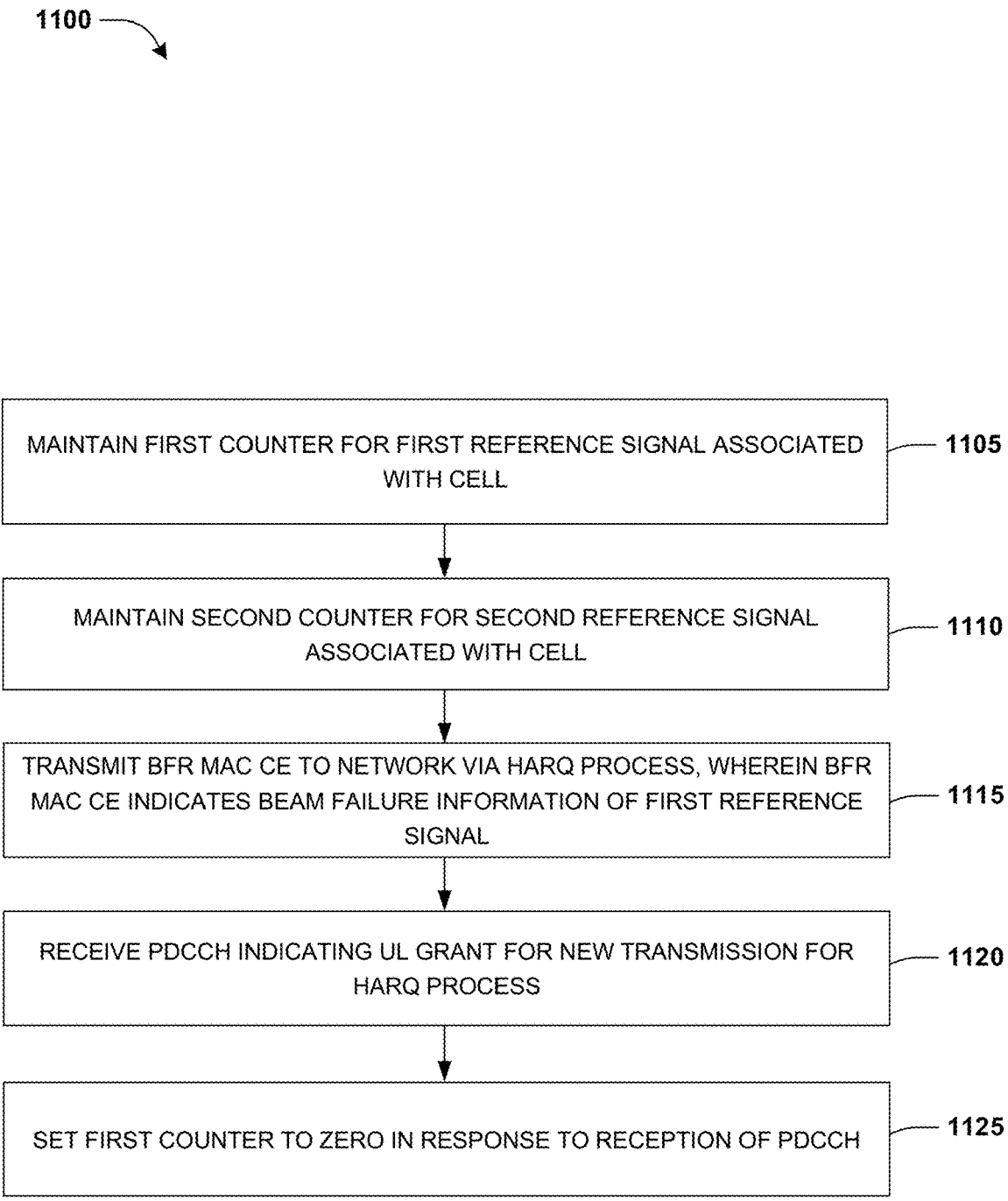
FIG. 11 is a flow chart according to one exemplary embodiment.

FIG. 11 is a flow chart 1100 according to one exemplary embodiment from the perspective of a UE. In step 1105, the UE maintains a first counter for a first reference signal associated with a cell. In step 1110, the UE maintains a second counter for a second reference signal associated with the cell. In step 1115, the UE transmits a BFR MAC CE to a network via a HARQ process, wherein the BFR MAC CE indicates beam failure information of the first reference signal. In step 1120, the UE receives a PDCCH indicating an uplink grant for a new transmission for the HARQ process. In step 1125, the UE sets the first counter to zero in response to the reception of the PDCCH.

In one embodiment, the UE does not set the second counter to zero in response to the reception of the PDCCH.

Referring back to FIGS. 3 and 4, in one exemplary embodiment of a UE, the device 300 includes a program code 312 stored in the memory 310. The CPU 308 may execute program code 312 to enable the UE (i) to maintain a first counter for a first reference signal associated with a cell, (ii) to maintain a second counter for a second reference signal associated with the cell, (iii) to transmit a BFR MAC CE to a network via a HARQ process, wherein the BFR MAC CE indicates beam failure information of the first reference signal, (iv) to receive a PDCCH indicating an uplink grant for a new transmission for the HARQ process, and (v) to set the first counter to zero in response to the reception of the PDCCH. Furthermore, the CPU 308 can execute the program code 312 to perform one, some and/or all of the above-described actions and steps and/or others described herein.

Figure 12:
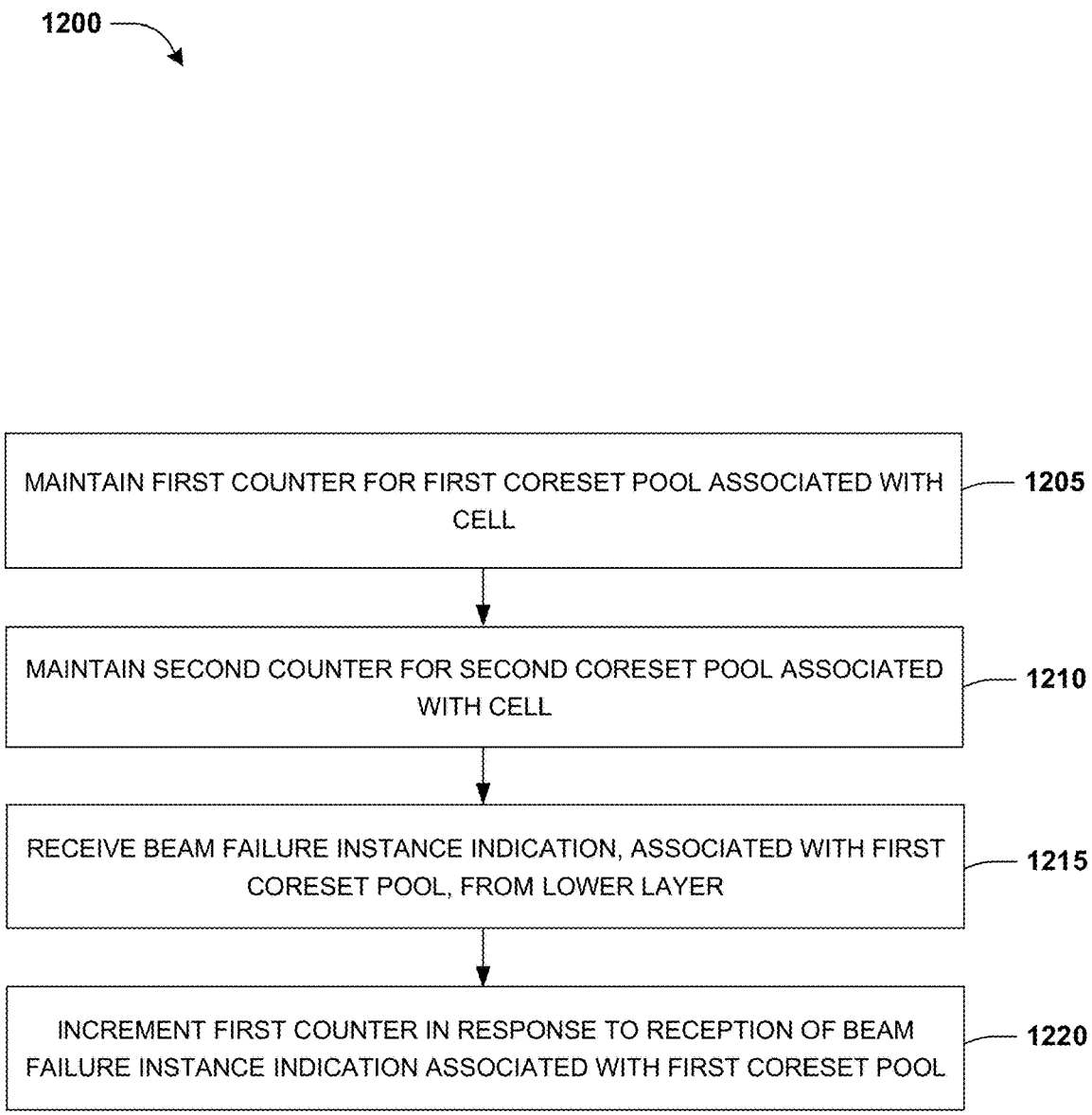
FIG. 12 is a flow chart according to one exemplary embodiment.

FIG. 12 is a flow chart 1200 according to one exemplary embodiment from the perspective of a UE. In step 1205, the UE maintains a first counter for a first CORESET pool associated with a cell. In step 1210, the UE maintains a second counter for a second CORESET pool associated with the cell. In step 1215, the UE receives a beam failure instance indication, associated with the first CORESET pool, from a lower layer (e.g., a physical layer of the UE). In step 1220, the UE increments the first counter in response to the reception of the beam failure instance indication associated with the first CORESET pool. For example, the UE may increment the first counter by one in response to the reception of the beam failure instance indication associated with the first CORESET pool. For example, the UE may increment the first counter in response to the reception of the beam failure instance indication based on the beam failure instance indication being associated with the first CORESET pool.

In one embodiment, the UE does not increment the second counter (for the second CORESET pool) in response to the reception of the beam failure instance indication. For example, the UE may not increment the second counter in response to the reception of the beam failure instance indication based on the beam failure instance indication being associated with the first CORESET pool.

Referring back to FIGS. 3 and 4, in one exemplary embodiment of a UE, the device 300 includes a program code 312 stored in the memory 310. The CPU 308 may execute program code 312 to enable the UE (i) to maintain a first counter for a first CORESET pool associated with a cell, (ii) to maintain a second counter for a second CORESET pool associated with the cell, (iii) to receive a beam failure instance indication, associated with the first CORE- SET pool, from a lower layer, and (iv) to increment (e.g., increment by one) the first counter in response to the reception of the beam failure instance indication associated with the first CORESET pool. Furthermore, the CPU 308 can execute the program code 312 to perform one, some and/or all of the above-described actions and steps and/or others described herein.

Figure 13:
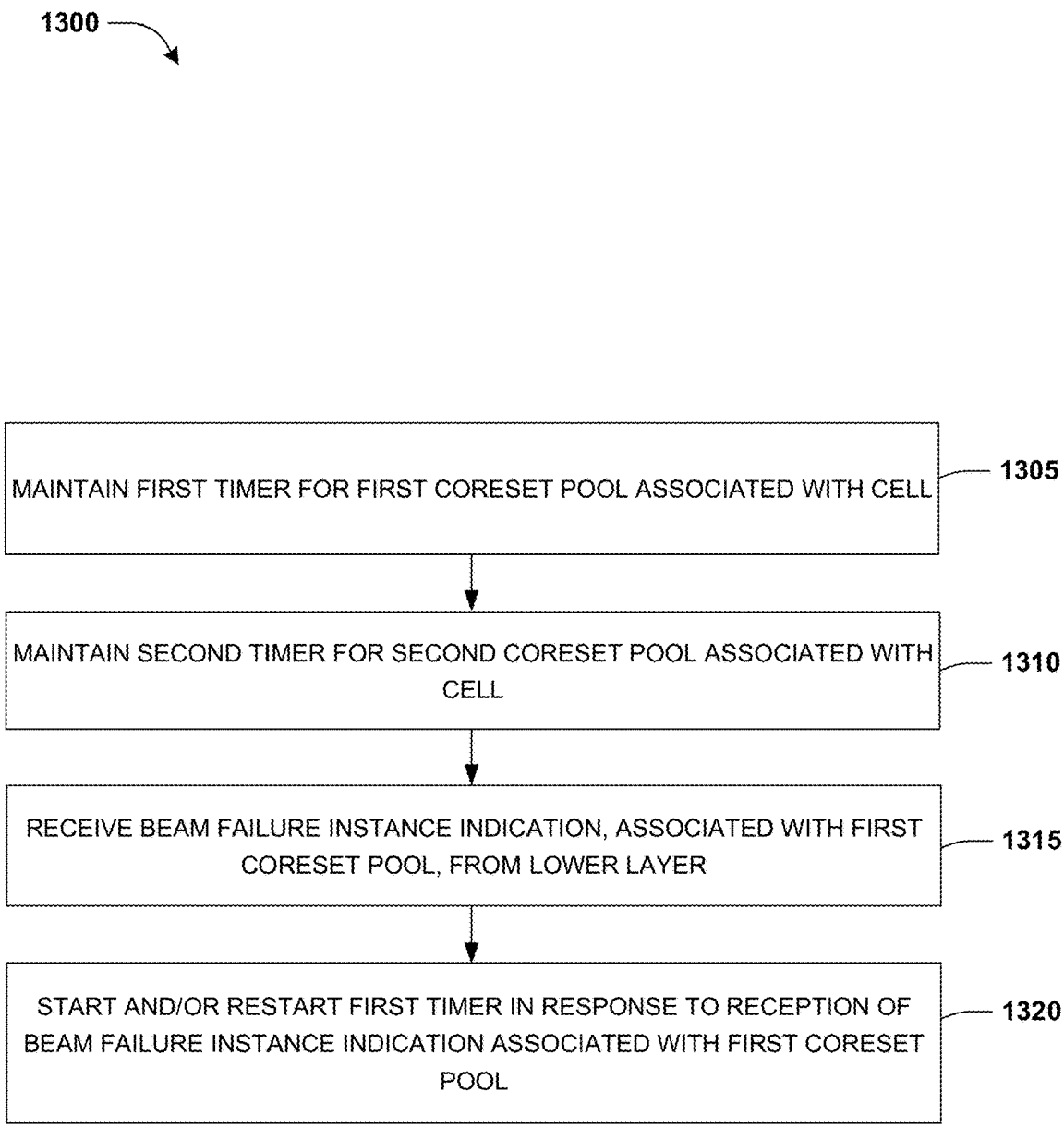
FIG. 13 is a flow chart according to one exemplary embodiment.

FIG. 13 is a flow chart 1300 according to one exemplary embodiment from the perspective of a UE. In step 1305, the UE maintains a first timer for a first CORESET pool associated with a cell. In step 1310, the UE maintains a second timer for a second CORESET pool associated with the cell. In step 1315, the UE receives a beam failure instance indication, associated with the first CORESET pool, from a lower layer (e.g., a physical layer of the UE). In step 1320, the UE starts and/or restarts the first timer in response to the reception of the beam failure instance indication associated with the first CORESET pool. For example, the UE may start and/or restart the first timer in response to the reception of the beam failure instance indication based on the beam failure instance indication being associated with the first CORESET pool.

In one embodiment, the UE does not start (and/or does not restart) the second timer (for the second CORESET pool) in response to the reception of the beam failure instance indication. For example, the UE may not start and/or may not restart the second timer in response to the reception of the beam failure instance indication based on the beam failure instance indication being associated with the first CORESET pool.

Referring back to FIGS. 3 and 4, in one exemplary embodiment of a UE, the device 300 includes a program code 312 stored in the memory 310. The CPU 308 may execute program code 312 to enable the UE (i) to maintain a first timer for a first CORESET pool associated with a cell, (ii) to maintain a second timer for a second CORESET pool associated with the cell, (iii) to receive a beam failure instance indication, associated with the first CORESET pool, from a lower layer, and (iv) to start and/or restart the first timer in response to the reception of the beam failure instance indication associated with the first CORESET pool. Furthermore, the CPU 308 can execute the program code 312 to perform one, some and/or all of the above-described actions and steps and/or others described herein.

Figure 14:
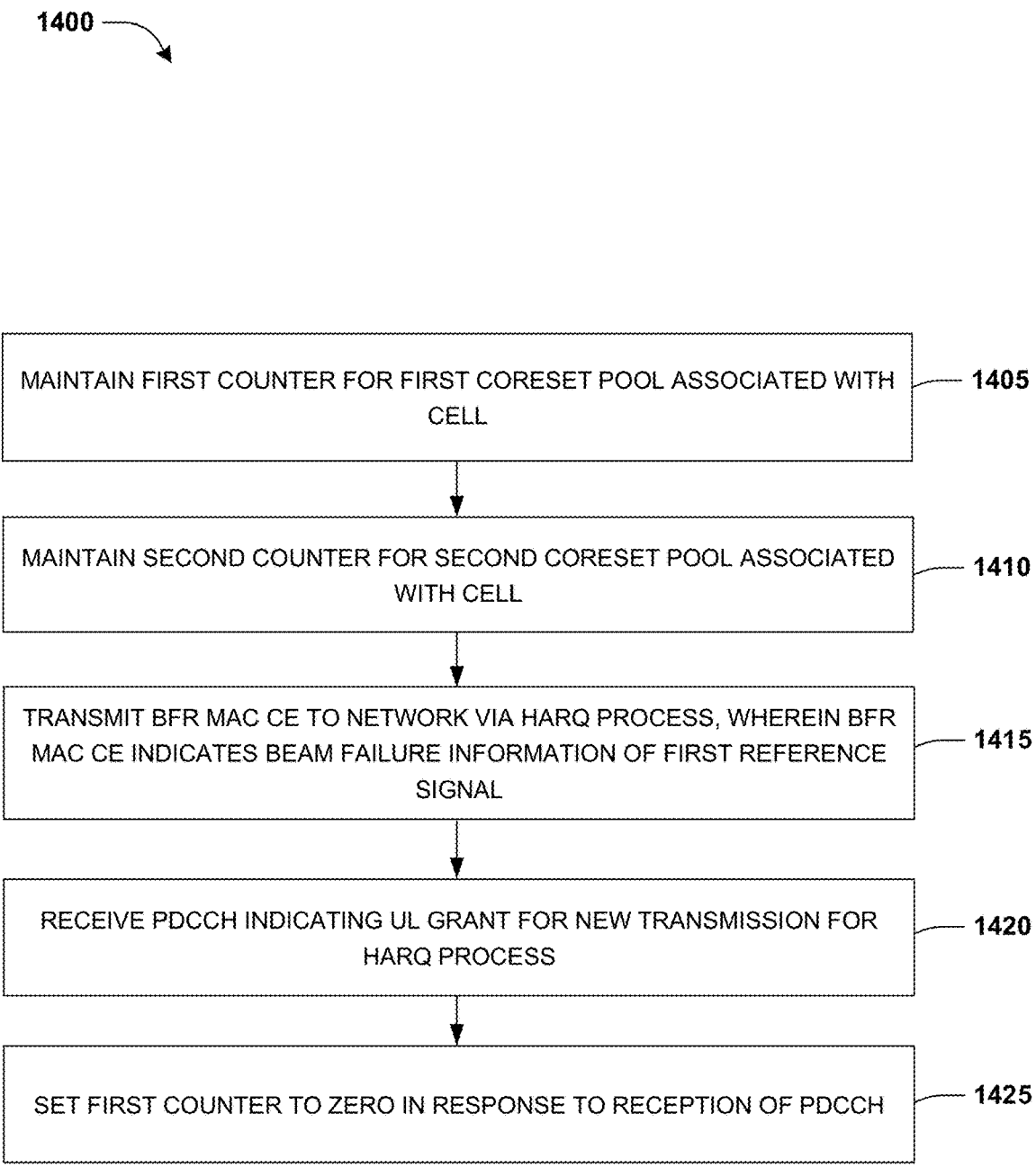
FIG. 14 is a flow chart according to one exemplary embodiment.

FIG. 14 is a flow chart 1400 according to one exemplary embodiment from the perspective of a UE. In step 1405, the UE maintains a first counter for a first CORESET pool associated with a cell. In step 1410, the UE maintains a second counter for a second CORESET pool associated with the cell. In step 1415, the UE transmits a BFR MAC CE to a network via a HARQ process, wherein the BFR MAC CE indicates beam failure information of the first reference signal. In step 1420, the UE receives a PDCCH indicating an uplink grant for new transmission for the HARQ process. In step 1425, the UE sets the first counter to zero in response to the reception of the PDCCH.

In one embodiment, the UE does not set the second counter to zero in response to the reception of the PDCCH.

Referring back to FIGS. 3 and 4, in one exemplary embodiment of a UE, the device 300 includes a program code 312 stored in the memory 310. The CPU 308 may execute program code 312 to enable the UE (i) to maintain a first counter for a first CORESET pool associated with a cell, (ii) to maintain a second counter for a second CORE-SET pool associated with the cell, (iii) to transmit a BFR MAC CE to a network via a HARQ process, wherein the BFR MAC CE indicates beam failure information of the first reference signal, (iv) to receive a PDCCH indicating an uplink grant for new transmission for the HARQ process, and (v) to set the first counter to zero in response to the reception of the PDCCH. Furthermore, the CPU 308 can execute the program code 312 to perform one, some and/or all of the above-described actions and steps and/or others described herein.

With respect to FIGS. 9-14, in one embodiment, the first counter is a first BFI_COUNTER and/or the second counter is a second BFI_COUNTER.

In one embodiment, the first reference signal is a first BFD-RS and/or the second reference signal is a second BFD-RS.

In one embodiment, the first reference signal is a first RadioLinkMonitoringRS and/or the second reference signal is a second RadioLinkMonitoringRS.

In one embodiment, the first timer is a first beamFailure-DetectionTimer and/or the second timer is a second beamFailureDetectionTimer.

In one embodiment, the UE sets a counter, associated with a number of beam failure instance indications, to zero in response to expiration (e.g., timer expiry) of the first timer and/or expiration (e.g., timer expiry) of the second timer (e.g., the counter may be indicative of the number of beam failure instance indications).

In one embodiment, the first counter is associated with a first number of beam failure instance indications associated with the first reference signal (e.g., the first counter may be indicative of the first number of beam failure instance indications associated with the first reference signal). The second counter is associated with a second number of beam failure instance indications associated with the second reference signal (e.g., the second counter may be indicative of the second number of beam failure instance indications associated with the second reference signal).

In one embodiment, the UE triggers a BFR or initiates a random access procedure when a counter value of the first counter and/or a counter value of the second counter is larger than or equal to a threshold (and/or the UE triggers the BFR or initiates the random access procedure in response to the counter value of the first counter and/or the counter value of the second counter becoming larger than or equal to the threshold).

In one embodiment, the first reference signal is associated with a first TRP of the cell. The second reference signal is associated with a second TRP of the cell.

In one embodiment, the first CORESET pool is associated with a first TRP of the cell. The second CORESET pool is associated with a second TRP of the cell.

Figure 15:
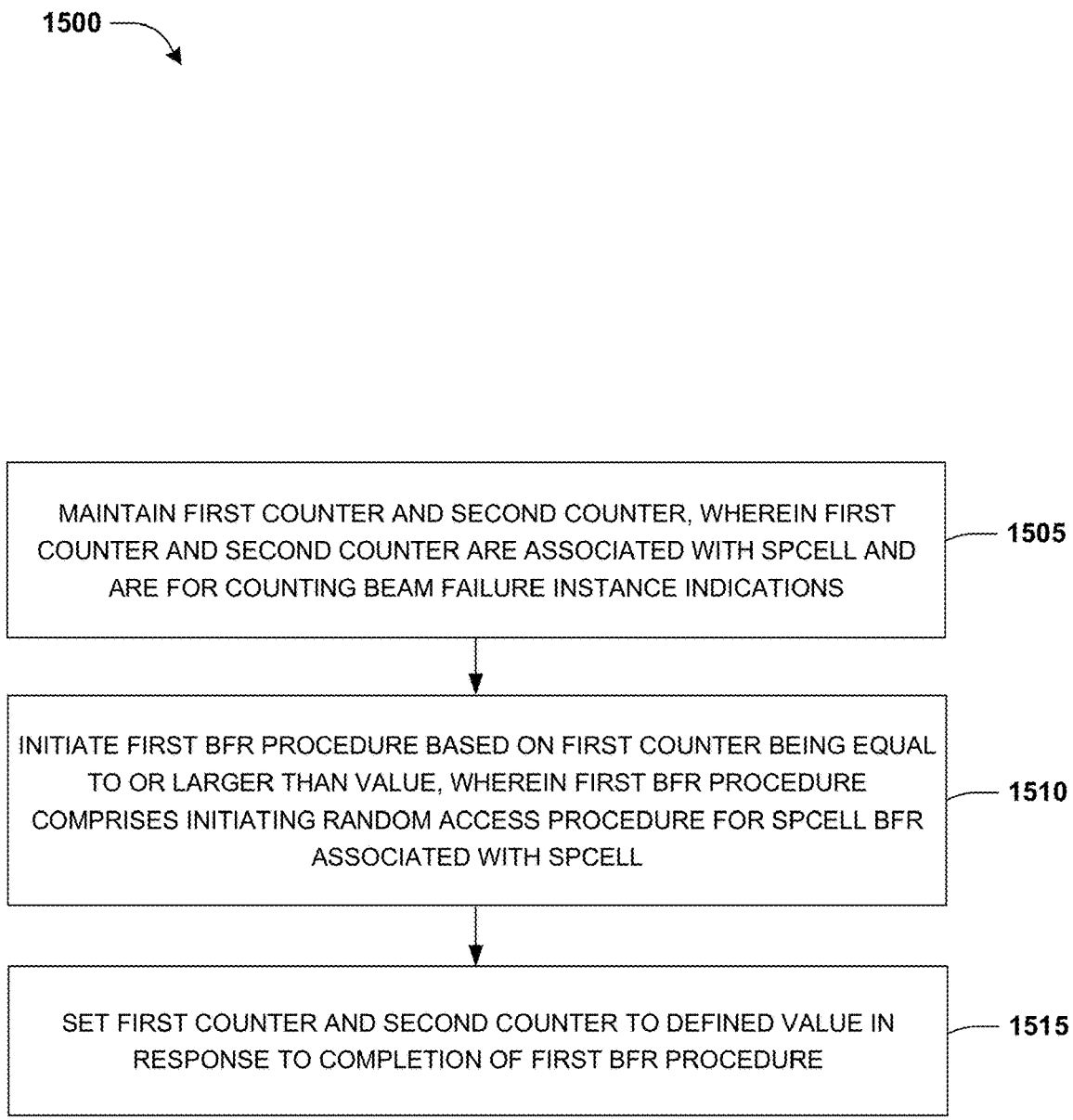
FIG. 15 is a flow chart according to one exemplary embodiment.

FIG. 15 is a flow chart 1500 according to one exemplary embodiment from the perspective of a UE. In step 1505, the UE maintains a first counter and a second counter. The first counter and the second counter are associated with a SpCell. The first counter and the second counter are for counting beam failure instance indications. For example, in response to a beam failure instance indication (e.g., in response to receiving a beam failure instance indication from a lower layer of the UE, such as a physical layer of the UE), a counter (e.g., the first counter or the second counter) may be incremented (e.g., incremented by 1). In step 1510, the UE initiates a first BFR procedure based on the first counter being equal to or larger than a value (e.g., a threshold). For example, the UE may initiate the first BFR procedure in response to the first counter becoming equal to or larger than the value. For example, the UE may initiate the first BFR procedure in response to incrementing the first counter to change a counter value of the first counter from a first counter value less than the value to a second counter value that is equal to or larger than the value, where the UE may increment the first counter in response to a beam failure instance indication, such as in response to receiving a beam failure instance indication from the lower layer of the UE. The first BFR procedure comprises initiating a random access procedure for SpCell BFR associated with the SpCell. In step 1515, the UE sets the first counter and the second counter to a defined value in response to completion of the first BFR procedure.

In one embodiment, maintaining the first counter and the second counter comprises controlling and/or modifying the first counter and/or the second counter (e.g., incrementing the first counter and/or the second counter based on beam failure instance indications).

In one embodiment, the first counter is associated with a first group of BFD-RSs of the SpCell and/or a first TRP of the SpCell. For example, the first counter may be incremented in response to a beam failure instance indication that is associated with the first group of BFD-RSs and/or the first TRP (e.g., the first counter may be incremented in response to receiving a beam failure instance indication that is associated with the first group of BFD-RSs and/or the first TRP). Alternatively and/or additionally, the first counter may be indicative of a first number of failure instance indications (e.g., a number of beam failure instance indications associated with the first group of BFD-RSs and/or the first TRP).

In one embodiment, the second counter is associated with a second group of BFD-RSs of the SpCell and/or a second TRP of the SpCell. For example, the second counter may be incremented in response to a beam failure instance indication that is associated with the second group of BFD-RSs and/or the second TRP (e.g., the second counter may be incremented in response to receiving a beam failure instance indication that is associated with the second group of BFD-RSs and/or the second TRP). Alternatively and/or additionally, the second counter may be indicative of a second number of failure instance indications (e.g., a number of beam failure instance indications associated with the second group of BFD-RSs and/or the second TRP).

In one embodiment, the UE initiates a second BFR procedure based on the first counter being equal to or larger than the value, wherein the second BFR procedure comprises triggering a BFR (e.g., the UE triggers the BFR as part of the second BFR procedure). In response to completion of the second BFR procedure, the UE sets the first counter to the defined value and does not set the second counter to the defined value (e.g., in response to the completion of the second BFR procedure, the UE sets the first counter to the defined value without setting the second counter to the defined value). In an example, setting the first counter to the defined value is performed without setting the second counter to the defined value (in response to the completion of the second BFR procedure) based on the second BFR procedure being initiated based on the first counter being equal to or larger than the value. Alternatively and/or additionally, setting the first counter to the defined value is performed without setting the second counter to the defined value (in response to the completion of the second BFR procedure) based on the BFR procedure not being initiated based on the second counter. Alternatively and/or additionally, setting the first counter to the defined value is performed without setting the second counter to the defined value (in response to the completion of the second BFR procedure) based on the second counter being smaller than the value when the second BFR procedure is initiated and/or when the second BFR procedure is completed. Alternatively and/or additionally, setting the first counter to the defined value is performed without setting the second counter to the defined value (in response to the completion of the second BFR procedure) based on the BFR being triggered based on the first counter being equal to or larger than the value (and/or based on the BFR not being triggered based on the second counter). Alternatively and/or additionally, setting the first counter to the defined value is performed without setting the second counter to the defined value (in response to the completion of the second BFR procedure) based on the second counter being smaller than the value when the BFR is triggered.

In one embodiment, the second BFR procedure comprises transmission, by the UE, of a first BFR MAC CE to a network via a first HARQ process, wherein the first BFR MAC CE is indicative of beam failure information of a TRP (e.g., the first TRP) associated with the first counter. For example, the UE may transmit the first BFR MAC CE to the network as part of the first HARQ process.

In one embodiment, the second counter is smaller than the value when the BFR is triggered.

In one embodiment, the completion of the second BFR procedure corresponds to reception, by the UE, of a PDCCH indicative of an uplink grant for a transmission (e.g., a new transmission) for a HARQ process (e.g., the first HARQ process) used for transmission of a BFR MAC CE (e.g., the first BFR MAC CE). For example, the PDCCH may correspond to an acknowledgement (ACK) transmitted by the network in response to receiving the BFR MAC CE (e.g., the first BFR MAC CE). For example, the second BFR procedure may be considered to be complete (by the UE, for example) based on reception of the PDCCH. In some examples, the new transmission may be an initial transmission of data and/or may be a transmission that is not a retransmission. In some examples, the UE may perform the new transmission using the uplink grant indicated by the PDCCH (e.g., the UE may perform the new transmission as part of the HARQ process).

In one embodiment, the second counter is equal to or larger than the value when the random access procedure is initiated. In an example, setting the second counter to the defined value is performed (in response to the completion of the first BFR procedure) based on the second counter being equal to or larger than the value when the first BFR procedure and/or the random access procedure are initiated. Alternatively and/or additionally, setting the second counter to the defined value is performed (in response to the completion of the first BFR procedure) based on the second counter being equal to or larger than the value when the first BFR procedure and/or the random access procedure are completed.

In one embodiment, the completion of the first BFR procedure corresponds to completion of the random access procedure. For example, the first BFR procedure may be considered to be complete (by the UE, for example) based on completion of the random access procedure.

In one embodiment, the UE sets the first counter to the defined value in response to switching from multi-TRP operation for the SpCell to single-TRP operation for the SpCell. For example, switching from multi-TRP operation for the SpCell to single-TRP operation for the SpCell may correspond to switching from using multiple TRPs of the SpCell (e.g., the first TRP and the second TRP) to using a single TRP of the SpCell (e.g., the UE may switch from communicating with the multiple TRPs in multi-TRP operation to communication with the single TRP in single-TRP operation).

In one embodiment, the defined value is zero.

Referring back to FIGS. 3 and 4, in one exemplary embodiment of a UE, the device 300 includes a program code 312 stored in the memory 310. The CPU 308 may execute program code 312 to enable the UE (i) to maintain a first counter and a second counter, wherein the first counter and the second counter are associated with a SpCell and are for counting beam failure instance indications, (ii) to initiate a first BFR procedure based on the first counter being equal to or larger than a value, wherein the first BFR procedure comprises initiating a random access procedure for SpCell BFR associated with the SpCell, and (iii) to set the first counter and the second counter to a defined value in response to completion of the first BFR procedure. Furthermore, the CPU 308 can execute the program code 312 to perform one, some and/or all of the above-described actions and steps and/or others described herein.

Figure 16:
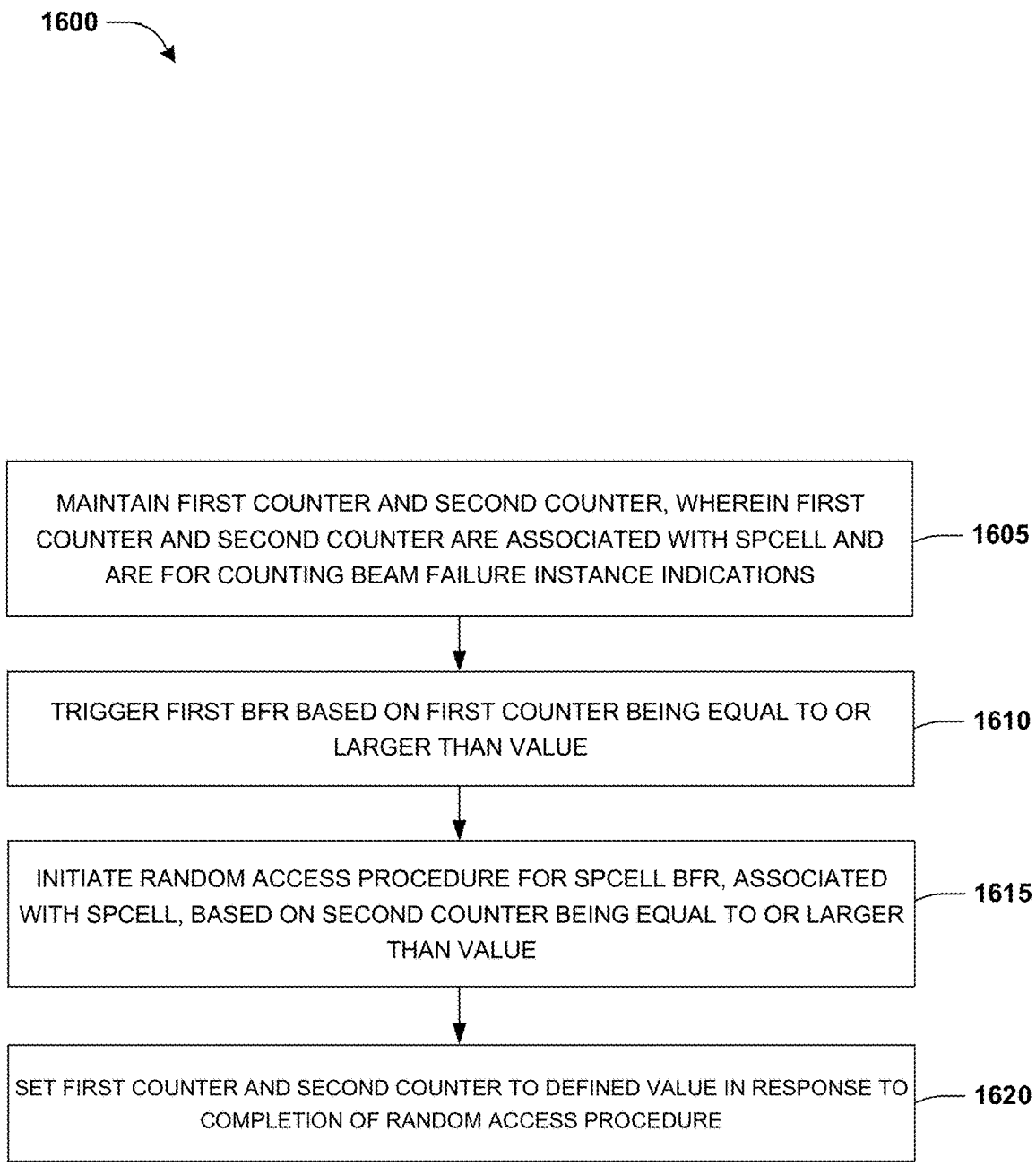
FIG. 16 is a flow chart according to one exemplary embodiment.

FIG. 16 is a flow chart 1600 according to one exemplary embodiment from the perspective of a UE. In step 1605, the UE maintains a first counter and a second counter. The first counter and the second counter are associated with a SpCell. The first counter and the second counter are for counting beam failure instance indications. For example, in response to a beam failure instance indication (e.g., in response to receiving a beam failure instance indication from a lower layer of the UE, such as a physical layer of the UE), a counter (e.g., the first counter or the second counter) may be incremented (e.g., incremented by 1). In step 1610, the UE triggers a first BFR based on the first counter being equal to or larger than a value (e.g., a threshold). For example, the UE may trigger the first BFR in response to the first counter becoming equal to or larger than the value. For example, the UE may trigger the first BFR in response to incrementing the first counter to change a counter value of the first counter from a first counter value less than the value to a second counter value that is equal to or larger than the value, wherein the UE may increment the first counter in response to a beam failure instance indication, such as in response to receiving a beam failure instance indication from the lower layer of the UE. In step 1615, the UE initiates a random access procedure for SpCell BFR, associated with the SpCell, based on the second counter being equal to or larger than the value. For example, the UE may initiate the random access procedure in response to the second counter becoming equal to or larger than the value. For example, the UE may initiate the random access procedure in response to incrementing the second counter to change a counter value of the second counter from a third counter value less than the value to a fourth counter that is equal to or larger than the value, wherein the UE may increment the second counter in response to a beam failure instance indication, such as in response to receiving a beam failure instance indication from the lower layer of the UE. In step 1620, the UE sets the first counter and the second counter to a defined value in response to completion of the random access procedure.

In one embodiment, maintaining the first counter and the second counter comprises controlling and/or modifying the first counter and the second counter (e.g., incrementing the first counter and/or the second counter based on beam failure instance indications).

In one embodiment, the UE triggers a second BFR based on the first counter being equal to or larger than the value. In response to the second BFR (e.g., in response to triggering the second BFR), the UE transmits a BFR MAC CE to a network via a HARQ process. For example, the UE may transmit the BFR MAC CE to the network as part of the HARQ process. In response to receiving a PDCCH indicative of an uplink grant for a transmission (e.g., a new transmission) for the HARQ process, the UE sets the first counter to the defined value and does not set the second counter to the defined value (e.g., in response to receiving the PDCCH, the UE sets the first counter to the defined value without setting the second counter to the defined value). In some examples, the new transmission may be an initial transmission of data and/or may be a transmission that is not a retransmission. In some examples, the UE may perform the new transmission using the uplink grant indicated by the PDCCH (e.g., the UE may perform the new transmission as part of the HARQ process). In an example, setting the first counter to the defined value is performed without setting the second counter to the defined value (in response to receiving the PDCCH) based on the second BFR being triggered based on the first counter being equal to or larger than the value. Alternatively and/or additionally, setting the first counter to the defined value is performed without setting the second counter to the defined value (in response to receiving the PDCCH) based on the second BFR not being triggered based on the second counter. Alternatively and/or additionally, setting the first counter to the defined value is performed without setting the second counter to the defined value (in response to receiving the PDCCH) based on the second counter being smaller than the value when the second BFR is triggered and/or when the BFR MAC CE is transmitted.

In one embodiment, the second counter is smaller than the value when the BFR MAC CE is transmitted.

In one embodiment, the first counter is associated with a first group of BFD-RSs of the SpCell and/or a first TRP of the SpCell. For example, the first counter may be incremented in response to a beam failure instance indication that is associated with the first group of BFD-RSs and/or the first TRP (e.g., the first counter may be incremented in response to receiving a beam failure instance indication that is associated with the first group of BFD-RSs and/or the first TRP). Alternatively and/or additionally, the first counter may be indicative of a first number of failure instance indications (e.g., a number of beam failure instance indications associated with the first group of BFD-RSs and/or the first TRP).

In one embodiment, the second counter is associated with a second group of BFD-RSs of the SpCell and/or a second TRP of the SpCell. For example, the second counter may be incremented in response to a beam failure instance indication that is associated with the second group of BFD-RSs and/or the second TRP (e.g., the second counter may be incremented in response to receiving a beam failure instance indication that is associated with the second group of BFD-RSs and/or the second TRP). Alternatively and/or additionally, the second counter may be indicative of a second number of failure instance indications (e.g., a number of beam failure instance indications associated with the second group of BFD-RSs and/or the second TRP).

In one embodiment, the defined value is zero.

Referring back to FIGS. 3 and 4, in one exemplary embodiment of a UE, the device 300 includes a program code 312 stored in the memory 310. The CPU 308 may execute program code 312 to enable the UE (i) to maintain a first counter and a second counter, wherein the first counter and the second counter are associated with a SpCell and are for counting beam failure instance indications, (ii) to trigger a first BFR based on the first counter being equal to or larger than a value, (iii) to initiate a random access procedure for SpCell BFR, associated with the SpCell, based on the second counter being equal to or larger than the value, and (iv) to set the first counter and the second counter to a defined value in response to completion of the random access procedure. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 9-16. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc.

The computer-readable medium may comprise processor-executable instructions, that when executed cause performance of one, some and/or all method steps illustrated in FIGS. 9-16, and/or one, some and/or all of the above-described actions and steps and/or others described herein.

It may be appreciated that applying one or more of the techniques provided herein may result in one or more benefits including, but not limited to, increased efficiency and/or increased speed of communication between devices (e.g., a UE and/or a network node). The increased efficiency and/or increased speed may be a result of enabling the UE to perform BFR procedures in multi-TRP scenarios using one or more of the techniques provided herein. Alternatively and/or additionally, the increased efficiency and/or increased speed may be due to reducing latency for performing BFR procedures. Alternatively and/or additionally, one or more of the techniques provided herein may provide for enhanced BFR procedures in multi-TRP scenarios.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   maintaining a first counter associated with a first threshold and a second counter associated with a second threshold, wherein the first counter and the second counter are:
      associated with a Special Cell (SpCell); and
      for counting beam failure instance indications;
   triggering a beam failure recovery (BFR) in response to the first counter being equal to or larger than the first threshold;
   setting the first counter to a defined value and not setting the second counter to the defined value when the UE receives a Physical Downlink Control Channel (PDCCH), addressed to Cell Radio Network Temporary Identifier (C-RNTI), indicative of an uplink grant for a new transmission for a Hybrid Automatic Repeat Request (HARQ) process used for transmission of a BFR Medium Access Control (MAC) Control Element (CE);
   initiating a random access procedure for SpCell BFR associated with the SpCell when the first counter is equal to or larger than the first threshold and the second counter is equal to or larger than the second threshold; and
   setting the first counter and the second counter to the defined value in response to completion of the random access procedure.

2. The method of claim 1, wherein:
   the first counter is associated with at least one of:
      a first group of beam failure detection reference signals (BFD-RSs) of the SpCell; or
      a first Transmission/Reception Point (TRP) of the SpCell; and
   the second counter is associated with at least one of:
      a second group of BFD-RSs of the SpCell; or
      a second TRP of the SpCell.

3. The method of claim 1, comprising:
   receiving a first configuration to configure the first threshold with a first value and a second configuration to configure the second threshold with a second value, wherein the first value is the same as or different from the second value.

4. The method of claim 1, comprising:
   transmitting, by the UE, the BFR MAC CE to a network via the HARQ process.

5. The method of claim 1, wherein:
   the second counter is smaller than the second threshold when the BFR is triggered.

6. The method of claim 1, wherein:
   the BFR MAC CE is indicative of beam failure information of a first Transmission/Reception Point (TRP) or a first group of beam failure detection reference signals (BFD-RSs) of the SpCell associated with the first counter.

7. The method of claim 1, comprising:
   maintaining a first beam failure detection timer and a second beam failure detection timer associated with the SpCell.

8. The method of claim 7, wherein:
   the first beam failure detection timer is associated with at least one of:
      a first group of beam failure detection reference signals (BFD-RSs) of the SpCell; or
      a first Transmission/Reception Point (TRP) of the SpCell; and the second beam failure detection timer is associated with at least one of:
      a second group of BFD-RSs of the SpCell; or
      a second TRP of the SpCell.

9. The method of claim 1, comprising:
   in response to switching from multi-Transmission/Reception Point (TRP) operation for the SpCell to single-TRP operation for the SpCell, setting the first counter to the defined value.

10. The method of claim 1, wherein:
    the defined value is zero.

11. A method of a User Equipment (UE), the method comprising:
    maintaining a first counter associated with a first threshold and a second counter associated with a second threshold, wherein the first counter and the second counter are:
       associated with a Special Cell (SpCell); and
       for counting beam failure instance indications;
    triggering a first beam failure recovery (BFR) in response to the first counter being equal to or larger than the first threshold;
    initiating, in response to the second counter being equal to or larger than the second threshold, a random access procedure for SpCell BFR associated with the SpCell;
    setting the first counter and the second counter to a defined value in response to completion of the random access procedure;
    triggering a second BFR in response to the first counter being equal to or larger than the first threshold;
    in response to the second BFR, transmitting a BFR Medium Access Control (MAC) Control Element (CE) to a network via a Hybrid Automatic Repeat Request (HARQ) process; and
    setting the first counter to the defined value and not setting the second counter to the defined value in response to receiving a Physical Downlink Control Channel (PDCCH) indicative of an uplink grant for a new transmission for the HARQ process.

12. The method of claim 11, wherein:
the BFR MAC CE is indicative of BFR information of a first group of beam failure detection reference signals (BFD-RSs) associated with the first counter.

13. The method of claim 11, comprising:
the second counter is smaller than the second threshold when the BFR MAC CE is transmitted.

14. The method of claim 11, wherein:
the first counter is associated with at least one of:
 a first group of beam failure detection reference signals (BFD-RSs) of the SpCell; or
 a first Transmission/Reception Point (TRP) of the SpCell; and
the second counter is associated with at least one of:
 a second group of BFD-RSs of the SpCell; or
 a second TRP of the SpCell.

15. The method of claim 11, wherein:
the defined value is zero.

16. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
 maintaining a first counter associated with a first threshold and a second counter associated with a second threshold, wherein the first counter and the second counter are:
  associated with a Special Cell (SpCell); and
  for counting beam failure instance indications;
 triggering a beam failure recovery (BFR) in response to the first counter being equal to or larger than the first threshold;
 setting the first counter to the defined value and not setting the second counter to the defined value when the UE receives a Physical Downlink Control Channel (PDCCH), addressed to Cell Radio Network Temporary Identifier (C-RNTI), indicative of an uplink grant for a new transmission for a Hybrid Automatic Repeat Request (HARQ) process used for transmission of a BFR Medium Access Control (MAC) Control Element (CE);
 initiating a random access procedure for SpCell BFR associated with the SpCell when the first counter is equal to or larger than the first threshold and the second counter is equal to or larger than the second threshold; and
 setting the first counter and the second counter to a defined value in response to completion of the random access procedure.

17. The UE of claim 16, wherein:
the first counter is associated with at least one of:
 a first group of beam failure detection reference signals (BFD-RSs) of the SpCell; or
 a first Transmission/Reception Point (TRP) of the SpCell; and
the second counter is associated with at least one of:
 a second group of BFD-RSs of the SpCell; or
 a second TRP of the SpCell.

18. The UE of claim 16, the operations comprising:
receiving a first configuration to configure the first threshold with a first value and a second configuration to configure the second threshold with a second value, wherein the first value is the same as or different from the second value.

19. The UE of claim 16, the operations comprising:
transmitting, by the UE, the BFR MAC CE to a network via the HARQ process, wherein the BFR MAC CE is indicative of beam failure information of a first Transmission/Reception Point (TRP) or a first group of beam failure detection reference signals (BFD-RSs) of the SpCell associated with the first counter.

20. The UE of claim 16, wherein:
the second counter is smaller than the second threshold when the BFR is triggered.

* * * * *